(12) United States Patent
Xu et al.

(10) Patent No.: US 12,113,667 B2
(45) Date of Patent: *Oct. 8, 2024

(54) NETWORK SLICE CONFIGURATION METHOD, APPARATUS, AND SYSTEM

(71) Applicant: HUAWEI TECHNOLOGIES CO., LTD., Guangdong (CN)

(72) Inventors: Ruiyue Xu, Shanghai (CN); Kai Zhang, Shanghai (CN); Xiaoqian Jia, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,116

(22) Filed: Jul. 31, 2023

(65) Prior Publication Data

US 2023/0379212 A1 Nov. 23, 2023

Related U.S. Application Data

(63) Continuation of application No. 17/584,886, filed on Jan. 26, 2022, now Pat. No. 11,750,453, which is a
(Continued)

(51) Int. Cl.
*H04L 41/0806* (2022.01)
*H04W 68/00* (2009.01)
*H04W 72/04* (2023.01)

(52) U.S. Cl.
CPC ....... *H04L 41/0806* (2013.01); *H04W 68/005* (2013.01); *H04W 72/04* (2013.01)

(58) Field of Classification Search
CPC ............ H04L 41/0806; H04W 68/005; H04W 72/04
See application file for complete search history.

(56) References Cited

U.S. PATENT DOCUMENTS

| 8,873,482 B2 | 10/2014 | Kokku et al. |
| 10,644,955 B2 | 5/2020 | Zhang et al. |

(Continued)

FOREIGN PATENT DOCUMENTS

| CN | 104363159 A | 2/2015 |
| CN | 106060900 A | 10/2016 |

(Continued)

OTHER PUBLICATIONS

"3rd Generation Partnership Project; Technical Specification Group Services and System Aspects; Telecommunication management; Study an management and orchestration of network slicing for next generation network (Release 14}", 3GPP Draft; PCR 28.801-100, Mar. 20, 2017, XP051258812, 54 pages.

(Continued)

*Primary Examiner* — Michael J Moore, Jr.
(74) *Attorney, Agent, or Firm* — WOMBLE BOND DICKINSON (US) LLP

(57) ABSTRACT

This application provides a network slice configuration method, apparatus, and system, and pertains to the field of wireless communications technologies. The method includes: after receiving a management request of a network slice, obtaining or determining, by a network slice manager, network resource information corresponding to a subnet included in the network slice, and then sending, in a form of a subnet management request to a subnet manager, the network resource information corresponding to the subnet, so that the subnet manager configures the corresponding subnet based on the network resource information corresponding to the subnet. In this application, network slice configuration efficiency can be improved.

20 Claims, 11 Drawing Sheets

Related U.S. Application Data continuation of application No. 16/574,578, filed on Sep. 18, 2019, now Pat. No. 11,265,210, which is a continuation of application No. PCT/CN2017/078189, filed on Mar. 24, 2017.

(56) References Cited

U.S. PATENT DOCUMENTS

| | | | |
|---|---|---|---|
| 10,819,592 B2 | 10/2020 | Li | |
| 11,032,214 B2 | 6/2021 | Sun et al. | |
| 11,265,210 B2* | 3/2022 | Xu | H04W 72/04 |
| 11,750,453 B2* | 9/2023 | Xu | H04L 41/342 370/254 |
| 2015/0139238 A1* | 5/2015 | Pourzandi | H04L 41/40 370/392 |
| 2017/0054595 A1* | 2/2017 | Zhang | H04L 41/0896 |
| 2017/0302587 A1* | 10/2017 | Houyou | H04L 47/70 |
| 2017/0332212 A1* | 11/2017 | Gage | H04W 36/26 |
| 2018/0077024 A1* | 3/2018 | Zhang | H04L 41/0896 |
| 2018/0123878 A1* | 5/2018 | Li | H04L 41/40 |
| 2018/0132117 A1* | 5/2018 | Senarath | G06F 11/3006 |
| 2018/0191782 A1* | 7/2018 | Djordjevic | H04L 63/0428 |
| 2018/0324187 A1* | 11/2018 | Heintel | H04L 67/1068 |
| 2019/0075512 A1* | 3/2019 | Jin | H04W 88/16 |
| 2019/0140904 A1* | 5/2019 | Huang | H04L 41/0894 |
| 2019/0230004 A1* | 7/2019 | Zhou | H04L 45/306 |
| 2019/0260690 A1* | 8/2019 | Sun | H04L 41/0895 |
| 2019/0312782 A1* | 10/2019 | Vaishnavi | H04L 41/0895 |
| 2019/0327149 A1* | 10/2019 | Sun | H04L 41/0895 |
| 2019/0327317 A1* | 10/2019 | Lu | H04L 67/53 |
| 2019/0357130 A1* | 11/2019 | Garcia Azorero | H04W 80/10 |
| 2019/0386878 A1* | 12/2019 | Chou | H04W 48/18 |
| 2019/0386925 A1* | 12/2019 | Ji | H04W 72/53 |
| 2020/0014589 A1* | 1/2020 | Xu | H04L 41/342 |
| 2020/0014608 A1* | 1/2020 | Xu | H04L 41/0806 |
| 2020/0252322 A1* | 8/2020 | Houyou | H04L 45/02 |

FOREIGN PATENT DOCUMENTS

| | | |
|---|---|---|
| CN | 106131891 A | 11/2016 |
| CN | 106375987 A | 2/2017 |
| EP | 3059903 A1 | 8/2016 |
| JP | 2016116184 A | 6/2016 |
| WO | 2011032595 A1 | 3/2011 |
| WO | 2017089024 A1 | 6/2017 |
| WO | 2018072612 A1 | 4/2018 |
| WO | 2018082502 A1 | 5/2018 |
| WO | 2018114009 A1 | 6/2018 |
| WO | 2018127144 A1 | 7/2018 |

OTHER PUBLICATIONS

HUAWEI: ""Add potential solution for creating a network slice instance to support a communication service"", 3GPP Draft; S5A-170115, vol. SA WG5, No. Munich; Feb. 13, 2017-Feb. 17, 2017, Feb. 6, 2017, XP051218994, 2 pages.

3GPP TR 28.801 V0.2.0:"3rd Generation Partnership Project; Technical Specification Group Services and System Aspects; Telecommunication management;Study on management and orchestration of network slicing for next generation network (Release 14)",Sep. 2016,total 19 pages.

3GPP TSG SA WG5 (Telecom Management) Meeting #111Bis,S5A-170096,Use case and requirements for create and terminate network slice subnet ,Ericsson,Feb. 13-17, 2017, Munich (Germany),total 4 pages.

3GPP TSG SA WG5 (Telecom Management) Meeting #111bis, S5A-170166,pCR TR 28.801add framework on Network Slice Management,Intel,Feb. 13-17, 2017, Munich (Germany)m,total 2 pages.

IEEE 802.1Qbv-2015, IEEE Standard for Local and metropolitan area networks Bridges and Bridged Networks Amendment 25: Enhancements for Scheduled Traffic. 2015. 57 pages.

3GPP TS 28.622 V11.4.0:"3rd Generation Partnership Project; Technical Specification Group Services and System Aspects;Telecommunication management; Generic Network Resource Model (NRM)Integration Reference Point (IRP); Information Service (IS) (Release 11)",Mar. 2017,total 22 pages.

* cited by examiner

NETWORK SLICE CONFIGURATION METHOD, APPARATUS, AND SYSTEM

CROSS-REFERENCE TO RELATED APPLICATIONS

This application is a continuation of U.S. patent application Ser. No. 17/584,886, filed on Jan. 26, 2022, which is a continuation of U.S. patent application Ser. No. 16/574,578, filed on Sep. 18, 2019, now U.S. Pat. No. 11,265,210. which is a continuation of International Application No. PCT/CN2017/078189, filed on Mar. 24, 2017. All of the aforementioned patent applications are hereby incorporated by reference in their entireties.

TECHNICAL FIELD

The present invention relates to the field of wireless communications technologies, and in particular, to a network slice configuration method, apparatus, and system.

BACKGROUND

A concept of a network slice is proposed in a 5th generation (5G) mobile communications technology system. The network slice may be understood as an on-demand network. A physical network may be logically divided into a plurality of network slices. Different network slices may be used to carry different services, and the different network slices may be physically isolated or logically isolated based on different requirements. It may be considered that a network slice is a combination that is of a network function and a network resource and that is required for completing a service (or some services), and is a complete logical network.

Different tenants can deploy their own services by leasing a network of a network operator, and the network operator can provide the network for the tenants in a form of a network slice. After obtaining service network requirements of the tenants, the network operator can determine requirement information of a corresponding network slice based on the network requirements. The requirement information may include information such as service type information, network slice type information, a service-level agreement (SLA) of a service, or a network key performance indicator (KPI). Then, a technician of the network operator can manually configure a network resource on each subnet manager of a core network (CN), an access network (AN), and a transport network (TN) based on the requirement information of the network slice, to configure the corresponding network slice.

In a process of implementing the present invention, the inventor finds that the foregoing processing has at least the following problem.

During network slice configuration, a lot of time and energy of a technician are consumed due to a manner of manually configuring a network resource. Consequently, network slice configuration efficiency is relatively low.

SUMMARY

To resolve the problem in the background, embodiments of the present invention provide a network slice configuration method, apparatus, and system. The technical solutions are as follows:

According to a first aspect, a network slice configuration method is provided. The method includes:

in a network slice configuration process, first obtaining or determining, by a network slice manager, network resource information corresponding to a subnet in a network slice, and then sending, in a manner of a subnet management request to a subnet manager of each subnet, network resource information corresponding to the subnet, so that the subnet manager configures the subnet based on the network resource information corresponding to the subnet.

In the solution shown in this embodiment of this disclosure, the network slice manager obtains or determines the network resource information corresponding to the subnet, and sends the network resource information to the subnet manager, so that the subnet manager can configure the subnet based on the network resource information. In the entire network slice configuration process, the network slice can be independently configured only by using devices such as the network slice manager and the subnet manager without manual participation of a technician, to improve network slice configuration efficiency.

In a possible implementation, the network slice manager may receive a management request that is of the network slice and that is sent by a BSS, a customer, or an SM, obtain requirement information that is of the network slice and that is carried in the management request of the network slice, and then further determine, based on the requirement information of the network slice, the network resource information corresponding to the subnet included in the network slice.

In the solution shown in this embodiment of this disclosure, the network slice manager may directly determine, locally based on the requirement information that is of the network slice and that is carried in the management request of the network slice, the network resource information corresponding to the subnet in the to-be-configured network slice. The network resource information of the subnet may be directly determined by the network slice manager.

In a possible implementation, after obtaining the requirement information of the network slice, the network slice manager may obtain, in a plurality of manners, the network resource information corresponding to the subnet. Specifically, the following manners may be included:

Manner 1: The network slice manager may first select, based on the requirement information of the network slice, a network slice template used to create or instantiate a network slice instance, and then may obtain the network resource information that is corresponding to the subnet and that is recorded in the network slice template.

Manner 2: The customer may pre-specify the network resource information of the subnet included in the network slice. Therefore, the requirement information of the network slice may include the network resource information, so that the network slice manager can directly obtain the network resource information corresponding to the subnet from the requirement information of the network slice.

Manner 3: A virtual resource manager may pre-synchronize various network resources to the network slice manager, so that after obtaining the requirement information of the network slice, the network slice manager can search a locally prestored network resource for network resource information that meets the requirement information, and use the network resource information as the network resource information of the subnet.

Manner 4: The network slice manager may send the requirement information of the network slice to the virtual resource manager, so that the virtual resource manager can search for proper network resource information based on the requirement information, and return a search result to the network slice manager.

In the solution shown in this embodiment of this disclosure, after obtaining the requirement information of the network slice, the network slice manager may determine the network resource information of the subnet in a plurality of feasible manners, so that a success rate of obtaining the network resource information corresponding to the subnet can be ensured, thereby improving network slice configuration efficiency.

In a possible implementation, the network slice manager may receive a subnet notification message sent by a first subnet manager, and learn that the first subnet manager has configured a first subnet. In addition, if the subnet notification message may further carry the network resource information corresponding to the subnet, the network slice manager may obtain, based on the subnet notification message, the network resource information corresponding to the subnet.

In the solution described in this embodiment of this disclosure, after determining the network resource information corresponding to the subnet and configuring the first subnet, the first subnet manager may provide the network resource information for the network slice manager in a form of the subnet notification message, so that the network slice manager does not need to redetermine the network resource information corresponding to the subnet, thereby saving processing resources of the network slice manager.

In a possible implementation, the network slice manager may receive a management request that is of the network slice and that is sent by a BSS, a customer, or an SM, obtain requirement information that is of the network slice and that is carried in the management request of the network slice, then divide the requirement information of the network slice into requirement information of subnets according to a preset division rule, and further send, to the first subnet manager, a first subnet management request that carries the requirement information of the subnet.

In the solution described in this embodiment of this disclosure, after obtaining the requirement information of the network slice, the network slice manager may divide the requirement information of the network slice into the requirement information of each subnet. In this way, the network slice manager needs to send only the requirement information of the subnet to the first subnet manager, so that the first subnet manager determines the network resource information corresponding to the subnet, thereby saving processing resources of the network slice manager.

In a possible implementation, the network resource information corresponding to the subnet may include a network resource type, or may include a network resource identifier, or may include both a network resource type and a network resource identifier.

According to a second aspect, a network slice configuration method is provided. The method includes:
determining or obtaining, by a first subnet manager, network resource information corresponding to a subnet, and then configuring the corresponding subnet based on the network resource information corresponding to the subnet, to be specific, configuring the network resource information in a component in the corresponding subnet; and if a received subnet management request is a subnet creation or instantiation request, first creating or instantiating the subnet based on the network resource information corresponding to the subnet, and then configuring the corresponding subnet based on the network resource information corresponding to the subnet.

In the solution described in this embodiment of this disclosure, after obtaining the network resource information corresponding to the subnet, the first subnet manager can automatically configure a first subnet without participation of a technician, so that efficiency of configuring the first subnet is relatively high.

In a possible implementation, the first subnet manager may directly obtain, based on the subnet management request sent by a network slice manager, the network resource information corresponding to the subnet.

In the solution described in this embodiment of this disclosure, after receiving the network resource information that is corresponding to the subnet and that is sent by the network slice manager, the first subnet manager can directly configure the first subnet based on the network resource information.

In a possible implementation, the first subnet manager may receive requirement information that is of the subnet and that is sent by the network slice manager, and then locally determine, based on the requirement information of the subnet, the network resource information corresponding to the subnet.

In the solution described in this embodiment of this disclosure, in addition to directly obtaining the network resource information corresponding to the subnet from the network slice manager, the first subnet manager may independently determine the related network resource information based on the requirement information of the subnet.

In a possible implementation, after determining the network resource information corresponding to the subnet, the first subnet manager may provide the network resource information for the network slice manager in a form of a subnet notification message.

In the solution described in this embodiment of this disclosure, in an entire network slice configuration process, the first subnet manager sends, to another subnet manager by using the network slice manager, the network resource information corresponding to the subnet, provided that the first subnet manager determines the network resource information, so that the another subnet manager configures a corresponding subnet based on the network resource information.

According to a third aspect, a network slice configuration method is provided. The method includes:
determining or obtaining, by a first subnet manager, network resource information corresponding to a subnet, and then sending, to a second subnet manager, a subnet notification message carrying the network resource information of the subnet, so that after receiving the subnet notification message, the second subnet manager can configure a second subnet based on the network resource information that is of the subnet and that is carried in the subnet notification message.

In the solution described in this embodiment of this disclosure, after obtaining the network resource information corresponding to the subnet, the first subnet manager may directly send the network resource information to the second subnet manager, so that the second subnet manager configures the second subnet. In addition, coordination resources of a network slice manager can be saved because the network slice manager does not need to forward the network resource information.

In a possible implementation, the first subnet manager may receive requirement information that is of the subnet and that is sent by a network slice manager, and then locally determine, based on the requirement information of the subnet, the network resource information corresponding to the subnet.

In the solution described in this embodiment of this disclosure, in addition to directly obtaining the network resource information corresponding to the subnet from the network slice manager, the first subnet manager may independently determine the related network resource information based on the requirement information of the subnet.

In a possible implementation, when sending a subnet management request to the first subnet manager, the network slice manager may further send address information of the second subnet manager to the first subnet manager, so that the first subnet manager can send a message to the second subnet manager based on the address information of the second subnet manager.

In the solution described in this embodiment of this disclosure, the network slice manager may record address information of all subnet managers. When sending the subnet management request to the first subnet manager, the network slice manager may also send the address information of the second subnet manager to the first subnet manager, so that the first subnet manager can directly communicate with the second subnet manager without using the network slice manager.

In a possible implementation, after receiving a network slice configuration request, the network slice manager may send a subnet management request to the second subnet manager, where the subnet management request may carry identification information of a to-be-configured network slice. Then, the second subnet manager may send a network resource information query request to the first subnet manager, where the request may include the identification information of the network slice (namely, a network slice identifier). If the first subnet manager receives the network resource information query request, the first subnet manager may determine the network resource information of the subnet corresponding to the network slice identifier, and send the network resource information to the second subnet manager.

In the solution described in this embodiment of this disclosure, the network slice manager allocates the network slice identifier to the network slice, so that when interacting with each other, subnet managers determine, based on the network slice identifier, the network resource information corresponding to the subnet in a corresponding network slice.

In a possible implementation, after determining or obtaining the network resource information corresponding to the subnet, the first subnet manager may configure the corresponding subnet based on the network resource information corresponding to the subnet, to be specific, configure the network resource information in a component in the corresponding subnet.

In the solution described in this embodiment of this disclosure, after obtaining the network resource information corresponding to the subnet, the first subnet manager can automatically configure a first subnet without participation of a technician, so that efficiency of configuring the first subnet is relatively high.

According to a fourth aspect, a network slice configuration method is provided. The method includes:

after receiving a subnet notification message sent by a first subnet manager, obtaining, by a second subnet manager, network resource information that is corresponding to a subnet and that is carried in the subnet notification message, and then configuring a second subnet based on the network resource information that is corresponding to the second subnet and that is included in the subnet notification message.

In the solution described in this embodiment of this disclosure, the second subnet manager directly receives the subnet notification message sent by the first subnet manager, and obtains the network resource information corresponding to the subnet from the subnet notification message, so that coordination resources of a network slice manager can be saved because the network slice manager does not need to forward the network resource information.

In a possible implementation, the second subnet manager may send a network resource information query request to the first subnet manager, to actively obtain the network resource information corresponding to the subnet, where the request may include identification information of a network slice (namely, a network slice identifier).

In the solution described in this embodiment of this disclosure, the second subnet manager sends the network resource information query request to the first subnet manager, so that coordination resources of a network slice manager can be saved because the network slice manager does not need to schedule the network resource information.

In a possible implementation, after receiving a network slice configuration request, a network slice manager may send a subnet management request to the second subnet manager, where the subnet management request may carry identification information of a to-be-configured network slice.

In the solution described in this embodiment of this disclosure, the network slice manager allocates a network slice identifier to the network slice, so that when interacting with each other, subnet managers determine, based on the network slice identifier, the network resource information corresponding to the subnet in a corresponding network slice.

In a possible implementation, when sending a subnet management request to the second subnet manager, a network slice manager may further send address information of the first subnet manager to the second subnet manager, so that the second subnet manager can send a message to the second subnet manager based on the address information of the first subnet manager.

In the solution described in this embodiment of this disclosure, the network slice manager may record address information of all subnet managers. When sending the subnet management request to the second subnet manager, the network slice manager may also send the address information of the first subnet manager to the second subnet manager, so that the second subnet manager can directly communicate with the first subnet manager without using the network slice manager.

According to a fifth aspect, a network slice manager is provided, and the network slice manager includes a processor and a transceiver. The processor implements the network slice configuration method according to the first aspect by executing an instruction.

According to a sixth aspect, a first subnet manager is provided, and the first subnet manager includes a processor and a transceiver. The processor implements the network slice configuration method according to the second aspect by executing an instruction.

According to a seventh aspect, a network slice configuration apparatus is provided, and the apparatus includes at least one module. The at least one module is configured to implement the network slice configuration method according to the first aspect.

According to an eighth aspect, a network slice configuration apparatus is provided, and the apparatus includes at least one module. The at least one module is configured to implement the network slice configuration method according to the second aspect.

According to a ninth aspect, a computer program product including an instruction is provided. When running on a network slice manager, the computer program product enables the network slice manager to perform the network slice configuration method according to the first aspect.

According to a tenth aspect, a computer program product including an instruction is provided. When running on a first subnet manager, the computer program product enables the first subnet manager to perform the network slice configuration method according to the second aspect.

According to an eleventh aspect, a network slice configuration system is provided, and the system includes a network slice manager and a first subnet manager. The network slice manager is configured to implement the network slice configuration method according to the first aspect, and the first subnet manager is configured to implement the network slice configuration method according to the second aspect.

DESCRIPTION OF EMBODIMENTS

To make the objectives, technical solutions, and advantages of this application clearer, the following further describes the implementations of this application in detail with reference to the accompanying drawings.

Figure 1:
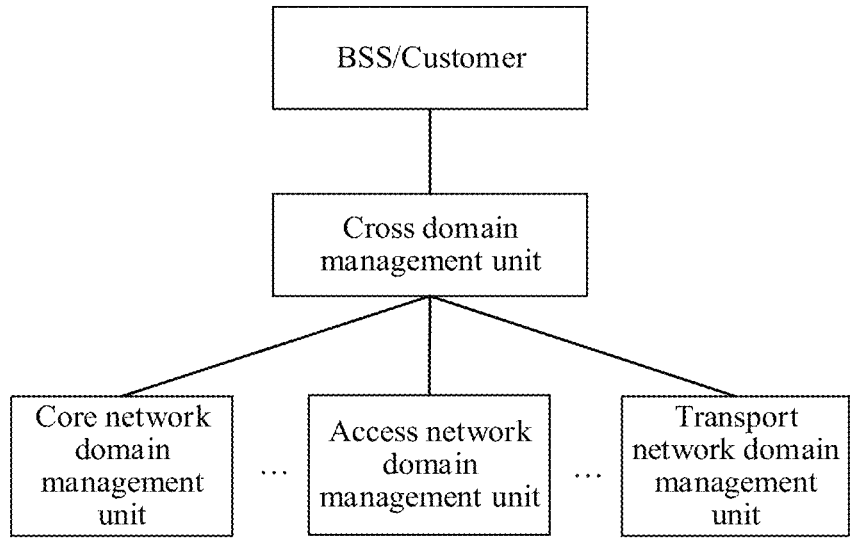
FIG. 1 is a schematic diagram of a network architecture of configuring a network slice according to an embodiment of the present invention.

Embodiments of this application provide a network slice configuration method. The method may be jointly completed by network managers on a plurality of sides. The network managers may include a cross domain manager, a core network domain manager, an access network domain manager, and a transport network domain manager. FIG. 1 shows a possible network architecture according to an embodiment of the present invention. As shown in FIG. 1, the network architecture includes a business support system (BSS), a cross domain management (CDM) unit, a core network domain management (CN-DM) unit, an access network domain management (AN-DM) unit, a transport network domain management (TN-DM) unit, and the like. The CDM is connected to the BSS, and the CDM is further connected to the CN-DM, the AN-DM, and the TN-DM separately. In a specific embodiment, the CN-DM, the AN-DM, and the TN-DM may be connected to each other. In this embodiment, a network slice manager may be the CDM or any manager carrying a CDM function. A first subnet manager may be the TN-DM or any manager carrying a TN-DM function. A second subnet manager may be the AN-DM and/or the CN-DM, or any manager carrying an AN-DM function and/or a CN-DM function. In this embodiment, a subnet may also be referred to as a subnet slice or a network slice subnet.

The following separately describes the BSS, the CDM, the CN-DM, and the TN-DM briefly.

Figure 2:
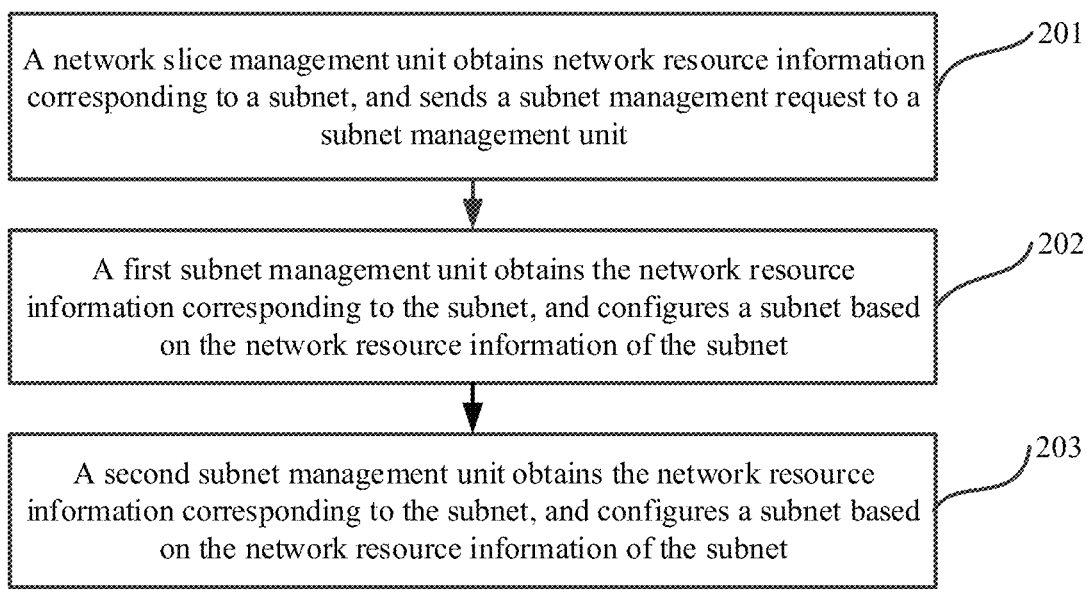
FIG. 2 is a flowchart of a network slice configuration method according to an embodiment of the present invention.

The BSS is responsible for service-related management (for example, including service operation, charging, and customer relationship management), and provides a service for a terminal. In the network architecture shown in FIG. 1, the BSS may also be replaced by a customer or a service management (SM) unit, or the BSS may have a function of a customer and/or a function of an SM. The function of the customer includes: managing a service and providing a corresponding service for the terminal. In FIG. 2, the "BSS/Customer" represents a unit having a function of the BSS and/or a function of the customer. The SM is mainly configured to: receive a service requirement of a related tenant, and convert the service requirement into requirement information of a network slice, and is also configured to perform service-related management.

The CDM may have an end-to-end network slice management function and/or an end-to-end network slice orchestration function, and may specifically have some or all of the following functions:

end-to-end network slice management (for example, network slice life cycle management, network slice template management, network slice fault management, network slice performance management, and network slice configuration management); mapping between an end-to-end network slice and a subnet, and mapping between a subnet and a network function; coordination of network resources or sub-SLAs provided by different domains (for example, an access network domain, a core network domain, and a transport network domain); and unified orchestration of subnet slices and network functions provided by subnets, so that subnet slices or network functions provided by different subnets can meet a target service or network slice requirement (for example, an SLA requirement, a key performance indicator (KPI) requirement, and a quality of service (QoS) requirement). The CDM may also be a network manager, a network orchestration unit, a network management and orchestration unit, a service manager, a service orchestration unit, or a service management and orchestration unit. It should be noted that the functions of the CDM are mainly described herein, and no limitation is imposed on a name of the CDM. The CDM may be referred to as a network slice management function (NSMF), a cross domain network slice manager, or the like.

The CN-DM may have a network slice core network subnet management function and/or a network slice core network subnet orchestration function, and may specifically have some or all of the following functions:

subnet slice management (including subnet slice life cycle management (creation, update, and deletion), subnet slice fault management, subnet slice performance management, subnet slice configuration management, and the like) in a core network domain; service management (including service life cycle management, service fault management, service performance management, service configuration management, and the like) in the core network domain; and unified coordination and orchestration of network resources (for example, NFs and NEs) in the core network domain. The CN-DM may also be a network manager, a network orchestration unit, a network management and orchestration unit, a service manager, a service orchestration unit, or a service management and orchestration unit. It should be noted that the functions of the CN-DM are mainly described herein, and no limitation is imposed on a name of the CN-DM. The CN-DM may be referred to as a core network slice subnet manager (Core NSSMF), a core network manager, or the like. The core NSSMF is an NSSMF.

The AN-DM may have a network slice access network subnet management function and/or a network slice access network subnet orchestration function, and may specifically have some or all of the following functions:

network slice subnet management (including network slice subnet life cycle management (creation, update, and deletion), network slice subnet fault management, network slice subnet performance management, network slice subnet configuration management, and the like) in an access network domain; service management (including service life cycle management, service fault management, service performance management, service configuration management, and the like) in the access network domain; and coordination of network resources (for example, NFs and NEs) in a core network domain for unified orchestration. The AN-DM may also be a network manager, a network orchestration unit, a network management and orchestration unit, a service manager, a service orchestration unit, or a service management and orchestration unit. It should be noted that the functions of the AN-DM are mainly described herein, and no limitation is imposed on a name of the AN-DM. The AN-DM may be referred to as an access network slice subnet manager (Access NSSMF), an access network manager, or the like. The access NSSMF is an NSSMF.

The TN-DM may have a network slice transport network subnet management function and/or a network slice transport network subnet orchestration function, and may specifically have some or all of the following functions:

network slice subnet management (including network slice subnet life cycle management (creation, update, and deletion), network slice subnet fault management, network slice subnet performance management, network slice subnet configuration management, and the like) in a transport domain; service management (including service life cycle management, service fault management, service performance management, service configuration management, and the like) in the transport network domain; and coordination of network resources (for example, NFs and NEs) in the transport network domain for unified orchestration. The TN-DM may also be a network manager, a network orchestration unit, a network management and orchestration unit, a service manager, a service orchestration unit, or a service management and orchestration unit. It should be noted that the functions of the TN-DM are mainly described herein, and no limitation is imposed on a name of the TN-DM. The TN-DM may be referred to as a transport network slice subnet manager (Transport NSSMF), a transport network manager, or the like. The transport NSSMF is an NSSMF.

The network slice may also be referred to as an end-to-end (E2E) network slice, and may include at least a core network (CN) part, an access network (AN) part, and a transport network (TN) part. Alternatively, the network slice may include any two of a CN part, an AN part, or a TN part. Alternatively, the network slice may represent a network slice in a CN part, a network slice in an AN part, or a network slice in a TN part. The network slice includes at least one network slice subnet, and the network slice subnet is referred to as a subnet below.

One NSSMF may manage one subnet, and the subnet may include one or more of the following: an AN part (for example, an AN NF), a CN part (for example, a CN NF), and a TN part (for example, a TN NF).

It may be understood that the network slice in this embodiment of the present invention may also be implemented in another manner. This is not limited in this embodiment of the present invention.

A processing procedure shown in FIG. 2 is described in detail below with reference to a specific implementation, and may include the following content.

Step 201: A network slice manager determines or obtains network resource information corresponding to a subnet, and sends a subnet management request to a subnet manager.

The network slice manager may be the CDM in the foregoing. The subnet may include at least one of a TN subnet, an AN subnet, and a CN subnet. The network resource information corresponding to the subnet may be used by the subnet manager to configure the subnet. The network resource information corresponding to the subnet may also be referred to as network slice network resource information, network resource information, network slice transmission resource information, transmission resource information, subnet connection information, network connection information, a subnet connection point, a subnet IP address, transmission resource information corresponding to the subnet, or the like. Herein, the network resource information corresponding to the subnet may be connection information of a network component (for example, a network function) included in the subnet. The subnet management request carries the network resource information of the subnet. The subnet management request herein may be any one of the following management requests: a creation request, an instantiation request, a configuration request, and the like.

In implementation, in a network slice configuration process, the network slice manager may first obtain the network resource information of the subnet corresponding to a network slice, and then send, to the subnet manager, the subnet management request carrying the network resource information of the subnet, so that after receiving the subnet management request, the subnet manager can configure the corresponding subnet based on the network resource information that is of the subnet and that is carried in the subnet management request. Herein, the subnet may also be referred to as a subnet slice, and a complete network slice may include a plurality of different subnets.

Step 202: A first subnet manager determines or obtains the network resource information corresponding to the subnet, and configures a subnet based on the network resource information of the subnet.

The first subnet manager may be a TN subnet manager.

In implementation, the first subnet manager may obtain the network resource information corresponding to the subnet, and then configure the corresponding subnet based on the network resource information corresponding to the subnet, to be specific, configure the network resource information in a component in the corresponding subnet. If a received subnet management request is a subnet creation or instantiation request, the first subnet manager first creates or instantiates the subnet based on the network resource information corresponding to the subnet, and then configures the corresponding subnet based on the network resource information corresponding to the subnet. A name of the subnet is not limited herein, and the subnet may be referred to as a first subnet, a TN subnet, or the like.

In different embodiments, step 202 may be performed after or before step 201.

Step 203: A second subnet manager obtains the network resource information corresponding to the subnet, and configures a subnet based on the network resource information of the subnet.

The second subnet manager may be a CN subnet manager/an AN subnet manager.

In implementation, the second subnet manager may obtain the network resource information corresponding to the subnet, and then configure the corresponding subnet based on the network resource information corresponding to the subnet, to be specific, configure the network resource information in a component in the corresponding subnet. If a received subnet management request is a subnet creation or instantiation request, the second subnet manager creates or instantiates the subnet based on the network resource information corresponding to the subnet, and then configures the corresponding subnet based on the network resource information corresponding to the subnet. A name of the subnet is not limited herein, and the subnet may be referred to as a second subnet, a CN subnet/an AN subnet, or the like.

In different embodiments, step 203 may be performed after step 202, or may be simultaneously performed with step 202.

Optionally, a procedure of step 201 to step 203 may specifically include the following feasible processing procedures based on different configuration manners.

Figure 3:
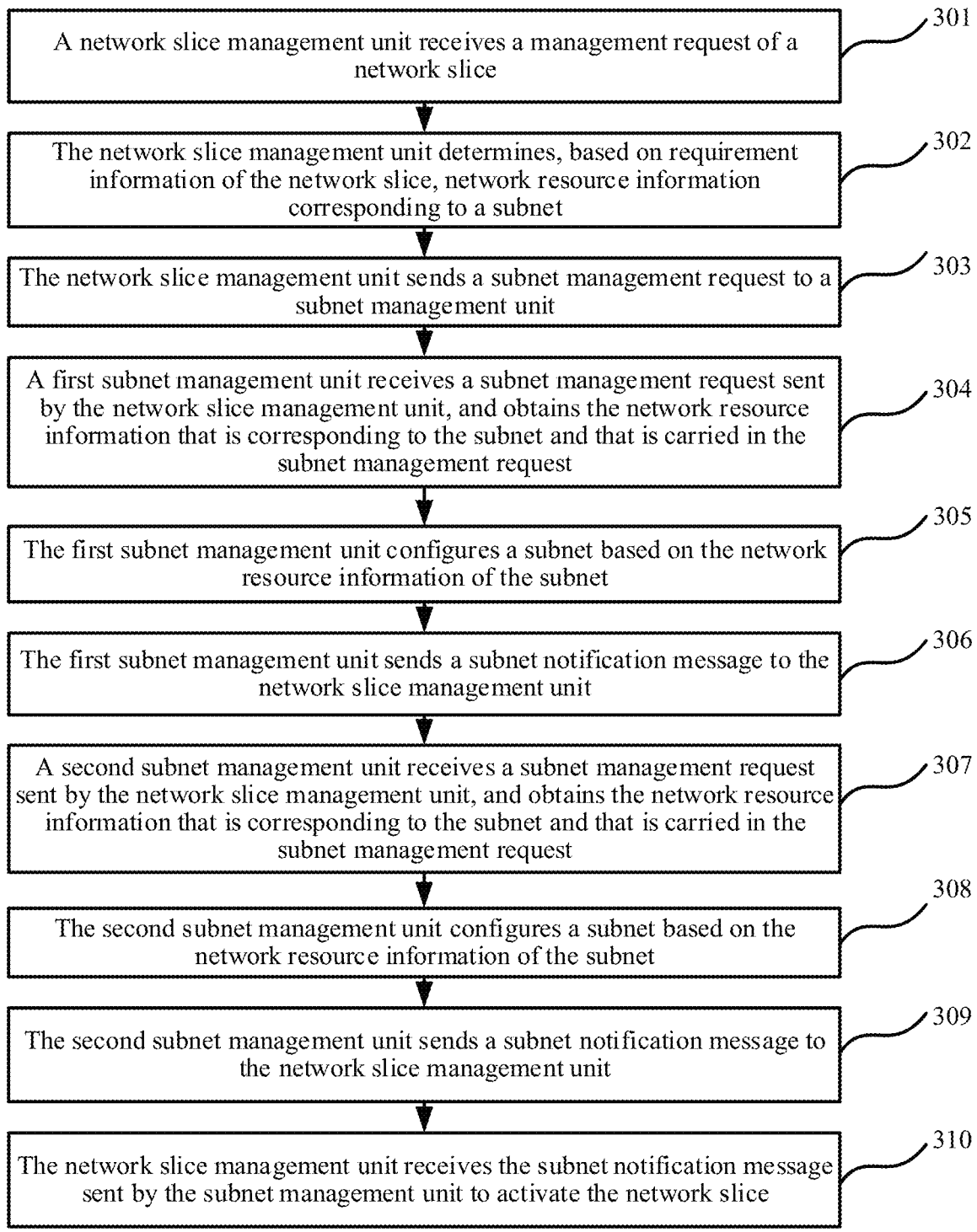
FIG. 3 is a flowchart of a network slice configuration method according to an embodiment of the present invention.

A procedure 1 is shown in FIG. 3.

Step 301: A network slice manager receives a management request of a network slice.

The management request of the network slice carries requirement information of the network slice. The requirement information of the network slice is necessary information used to determine a network slice. For example, the requirement information of the network slice may include some or all of the following content: a network slice type (for example, enhanced mobile broadband (eMBB), massive machine-type communications (mMTC), or ultra-reliable and low-latency communications (URLLC)), an SLA requirement of a service, a network KPI, or the like. The SLA requirement of the service or the network KPI may include at least one of the following: a latency, a report success ratio, a command success ratio, coverage, a capacity, reliability, or a throughput. The report success ratio may be a ratio that an uplink packet is successfully sent. The command success ratio may be a ratio that a downlink packet is successfully sent. The coverage may refer to a distribution area of a terminal. The capacity may refer to a quantity of terminals that can be accommodated.

In implementation, when a network slice needs to be configured to support a service, the user may send the management request of the network slice to the network slice manager on an operable interface provided by a system. Alternatively, the BSS sends the management request of the network slice to the network slice manager. Alternatively, after receiving a service requirement of a related tenant, the SM converts the service requirement into requirement information of a corresponding network slice, to send the management request of the network slice to the network slice manager. The management request of the network slice may carry the requirement information of the network slice or indication information of the requirement information of the network slice, and the management request is used to instruct the network slice manager to configure the corresponding network slice based on the requirement information of the network slice. The management request herein may be any one of the following requests: a network slice creation request, a network slice configuration request, a network slice allocation request, a network slice instantiation request, or a service request.

Step 302: The network slice manager determines, based on the requirement information of the network slice, network resource information corresponding to a subnet.

In implementation, after receiving the management request of the network slice, the network slice manager may determine, based on the requirement information that is of the network slice and that is carried in the management request of the network slice, the network resource information corresponding to the subnet included in the network slice.

Specifically, the network slice manager determines, in various manners based on the requirement information of the network slice, the network resource information corresponding to the subnet. The following feasible manners are provided.

Manner 1: The network slice manager determines a network slice template based on the requirement information of the network slice, and obtains the network resource information that is corresponding to the subnet and that is recorded in the network slice template.

The network slice template is used to create or instantiate a network slice instance. A name of the network slice template is not limited in this embodiment. The network slice template may also be referred to as a network slice descriptor, a network slice blueprint, or the like.

In implementation, after obtaining the requirement information of the network slice, the network slice manager may determine, based on the requirement information, a corresponding network slice template in a database in which the network slice template is prestored, and then obtain the network resource information that is corresponding to the subnet belonging to the network slice and that is recorded in the network slice template.

Manner 2: The network slice manager obtains the network resource information that is corresponding to the subnet and that is included in the requirement information of the network slice.

In implementation, the network resource information corresponding to the subnet belonging to the network slice may be recorded in the requirement information of the network slice. Therefore, the network slice manager may directly obtain the network resource information that is corresponding to the subnet and that is included in the requirement information of the network slice.

Manner 3: The network slice manager queries, based on the requirement information of the network slice, the network resource information corresponding to the subnet in a prestored network resource information list.

In implementation, a virtual resource manager (for example, an NFVO, a VNFM, or a VIM) may pre-synchronize various network resources to the network slice manager, and the network slice manager may store a correspondence between requirement information of different network slices and different network resource information to generate the network resource information list. In this way, after obtaining the requirement information of the network slice, the network slice manager can query the network resource information corresponding to the subnet in the network resource information list.

Manner 4: The network slice manager obtains, from a virtual resource manager based on the requirement information of the network slice, the network resource information corresponding to the requirement information of the network slice.

In implementation, after obtaining the requirement information of the network slice, the network slice manager may send a network resource information obtaining request to the virtual resource manager, where the request may carry the requirement information of the network slice. Then, the virtual resource manager may feed back, to the network slice manager, the network resource information corresponding to the corresponding subnet.

Optionally, the network resource information includes at least one of a network resource type and a network resource identifier.

The network resource type may be "local", "vlan", "vxlan", "gre", or "l3-vpn". When the network resource type is "vlan" or "xlan", the network resource identifier may be correspondingly "vlan ID" or "Xlan ID". When the network resource type is "gre", the network resource identifier may be "gre key".

In implementation, that the network slice manager determines, based on the requirement information of the network slice, the network resource information corresponding to the subnet may include the following processing: The network slice manager first determines, based on the requirement information of the network slice, the network resource type corresponding to the subnet in the network slice, and then determines the network resource identifier that is of the subnet and that is in the network resource type. Specifically, the network slice manager may determine, in a plurality of prestored network slice templates, the network slice template corresponding to the requirement information of the network slice, and determine a network resource type recorded in the network slice template as the network resource type corresponding to the subnet. Alternatively, the network slice manager may obtain slice type information included in the requirement information of the network slice, and determine a network resource type corresponding to the slice type information as the network resource type corresponding to the subnet. Then, the network slice manager searches the prestored network resource list for an available network resource identifier in the network resource type; or the network slice manager may obtain the network resource identifier in the network resource type from the virtual resource manager. If there are a plurality of network resource identifiers in a network resource type, the network slice in this embodiment may determine one or more network resource identifiers.

It should be noted that the foregoing processing is applicable to a case in which the network resource information includes both the network resource type and the network resource identifier, and if there is only one network resource identifier in each network resource type, the network resource information may include only the network resource type. Similarly, if the network slice manager and a subnet manager support only a network slice in a network resource type, the network resource information may include only the network resource identifier.

Step 303: The network slice manager sends a subnet management request to a subnet manager.

The subnet management request carries the network resource information corresponding to the subnet.

In implementation, after determining the network resource information corresponding to the subnet, the network slice manager may send, to the subnet manager in a manner of the subnet management request, the network resource information corresponding to the subnet. If the network slice includes all of a TN subnet, a CN subnet, and an AN subnet, the network slice manager herein separately sends the subnet management request to a TN subnet manager (namely, a first subnet manager), a CN subnet manager, and an AN subnet manager.

Step 304: The first subnet manager receives a subnet management request sent by the network slice manager, and obtains the network resource information that is corresponding to the subnet and that is carried in the subnet management request.

The network resource information herein corresponding to the subnet may be considered as network resource information of the TN subnet, or network resource information of the AN subnet or CN subnet corresponding to the TN subnet.

In implementation, after the network slice manager sends the subnet management request to the subnet manager, the first subnet manager may receive the corresponding subnet management request, and then obtain the network resource information that is corresponding to the subnet and that is carried in the subnet management request.

Step 305: The first subnet manager configures a subnet based on the network resource information of the subnet.

In implementation, after obtaining the network resource information corresponding to the subnet, the first subnet manager may configure a first subnet based on the network resource information corresponding to the subnet. Herein, the subnet is configured for establishment of a communication connection between the subnet and another subnet. For example, the first subnet is the TN subnet, and the another subnet includes the AN subnet and the CN subnet. The first subnet is configured for establishment of communication connections between a TN NF in the first subnet and an AN NF and a CN NF in the another subnet, to establish communication between the AN NF and the CN NF.

Step 306: The first subnet manager sends a subnet notification message to the network slice manager.

In implementation, after configuring the first subnet, the first subnet manager may send the subnet notification message to the network slice manager, to notify the network slice manager that the first subnet has been configured.

Step 307: A second subnet manager receives a subnet management request sent by the network slice manager, and obtains the network resource information that is corresponding to the subnet and that is carried in the subnet management request.

It should be noted that the network resource information herein corresponding to the subnet may be considered as network resource information of the AN subnet or CN subnet, or network resource information of the TN subnet corresponding to the AN subnet or CN subnet.

In implementation, after the network slice manager sends the subnet management request to the subnet manager, the second subnet manager may receive the corresponding subnet management request, and then obtain the network resource information that is corresponding to the subnet and that is carried in the subnet management request.

It may be understood that step 307 and step 305 are not necessarily performed in sequence. Step 307 may be performed before step 305, or may be simultaneously performed with step 305.

Step 308: The second subnet manager configures a subnet based on the network resource information of the subnet.

In implementation, after obtaining the network resource information corresponding to the subnet, the second subnet manager may configure a second subnet based on the network resource information corresponding to the subnet. The second subnet herein may be the AN subnet or the CN subnet. In this embodiment, the AN subnet manager and the CN subnet manager perform processing basically in a same manner, and therefore are collectively referred to as the second subnet manager, and are not separately described.

Step 309: The second subnet manager sends a subnet notification message to the network slice manager.

In implementation, after configuring the second subnet, the second subnet manager may send the subnet notification message to the network slice manager, to notify the network slice manager that the second subnet has been configured.

Step 310: The network slice manager receives the subnet notification message sent by the subnet manager to activate the network slice.

In implementation, the network slice manager may receive the subnet notification message sent by the subnet manager to learn that the subnet has been configured. In this way, if the network slice includes the TN subnet, the CN subnet, and the AN subnet, after receiving a TN subnet notification message, a CN subnet notification message, and an AN subnet notification message, the network slice manager may determine that all subnets included in the network slice have been configured, so that the network slice can be activated. Therefore, the network slice is configured.

Figure 4:
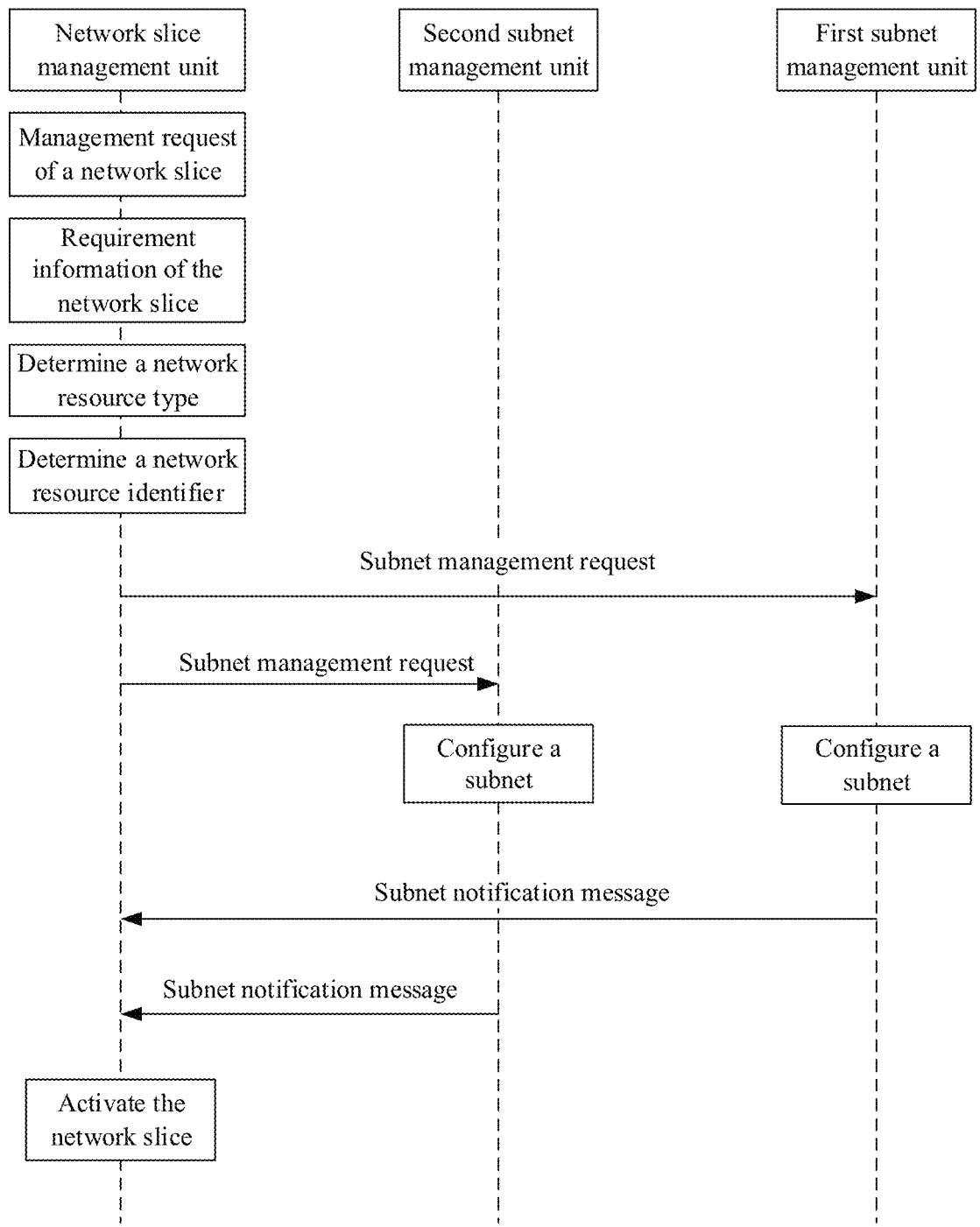
FIG. 4 is a schematic flowchart of configuring a network slice according to an embodiment of the present invention.
Figure 5:
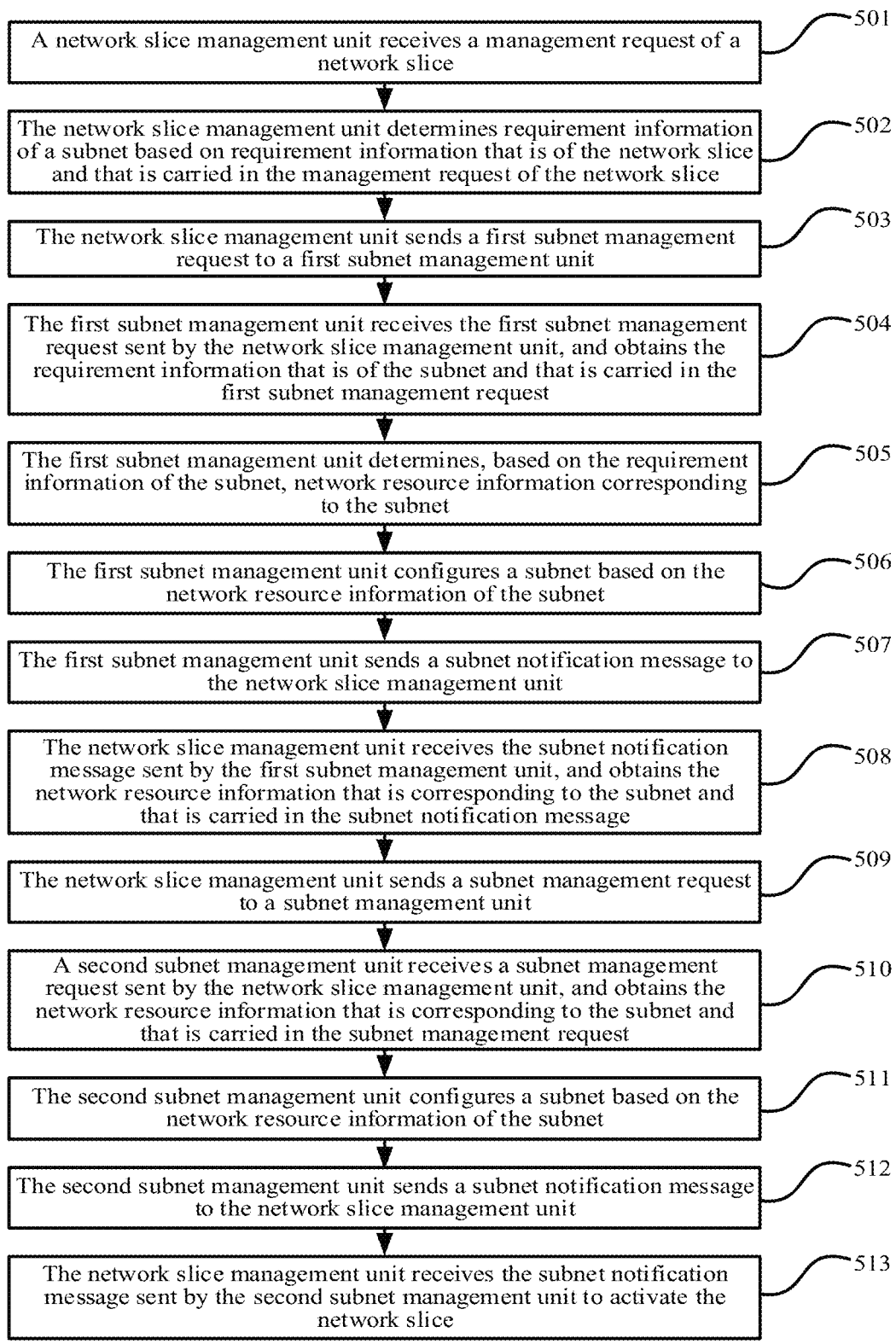
FIG. 5 is a flowchart of a network slice configuration method according to an embodiment of the present invention.

FIG. 4 is a schematic flowchart of configuring the network slice in step 301 to step 310.

In this embodiment of the present invention, the network slice manager determines the network resource information, and then instructs each subnet manager to configure the subnet based on the network resource configuration information, to automatically complete network slice configuration work, so that time and energy of a technician are saved because the technician does not need to manually configure the network slice, thereby improving network slice configuration efficiency.

Procedure 2:

Step 501: A network slice manager receives a management request of a network slice.

For detailed processing, refer to step 301.

Step 502: The network slice manager determines requirement information of a subnet based on requirement information that is of the network slice and that is carried in the management request of the network slice.

The requirement information of the subnet is necessary information used to determine a subnet. For example, the requirement information of the subnet may include some or all of the following content: an SLA requirement of a service, a network KPI, or the like. The SLA requirement of the service or the network KPI may include at least one of the following: a latency, a report success ratio, a command success ratio, coverage, a capacity, reliability, or a throughput.

In implementation, after obtaining the requirement information of the network slice, the network slice manager may divide the requirement information of the network slice into requirement information of subnets (for example, an AN subnet, a CN subnet, and a TN subnet) based on a preset division rule. For example, if a latency of the network slice is 10 ms, a sum of a latency of the AN subnet, a latency of the CN subnet, and a latency of the TN subnet is 10 ms. Further, it may be determined that the latency of the AN subnet is 3 ms, the latency of the CN subnet is 3 ms, and the latency of the TN subnet is 5 ms.

Step 503: The network slice manager sends a first subnet management request to a first subnet manager.

The first subnet management request carries requirement information of a subnet, and the first subnet manager may be a TN subnet manager.

In implementation, after determining requirement information of each subnet, the network slice manager may send the first subnet management request to the first subnet manager, where the first subnet management request may carry the requirement information of the subnet.

Step 504: The first subnet manager receives the first subnet management request sent by the network slice manager, and obtains the requirement information that is of the subnet and that is carried in the first subnet management request.

In implementation, the first subnet manager may receive the first subnet management request sent by the network slice manager, and then obtain the requirement information that is of the subnet and that is carried in the first subnet management request.

Step 505: The first subnet manager determines, based on the requirement information of the subnet, network resource information corresponding to the subnet.

In implementation, after obtaining the requirement information of the subnet, the first subnet manager may determine, based on the requirement information of the subnet, the network resource information corresponding to the subnet.

Specifically, the first subnet manager determines, in various manners based on the requirement information of the subnet, the network resource information corresponding to the subnet. The following feasible manners are provided.

Manner 1: The first subnet manager determines a network slice template based on the requirement information of the subnet, and obtains the network resource information that is corresponding to the subnet and that is recorded in the network slice template.

In implementation, after obtaining the requirement information of the subnet, the first subnet manager may determine, based on the requirement information, a corresponding network slice template in a database in which the network slice template is prestored, and then obtain the network resource information that is corresponding to the subnet included in the network slice and that is recorded in the network slice template.

Manner 2: The first subnet manager obtains the network resource information that is corresponding to the subnet and that is included in the requirement information of the subnet.

In implementation, the network resource information corresponding to the subnet included in the network slice may be recorded in the requirement information of the subnet. Therefore, the first subnet manager may directly obtain the network resource information that is corresponding to the subnet and that is recorded in the requirement information of the subnet.

Manner 3: The first subnet manager queries, based on the requirement information of the subnet, the network resource information corresponding to the subnet in a prestored network resource information list.

In implementation, a virtual resource manager (for example, an NFVO or a VIM) may pre-synchronize various network resources to the first subnet manager, and the first subnet manager may store a correspondence between requirement information of different subnets and different network resource information to generate the network resource information list. In this way, after obtaining the requirement information of the subnet, the first subnet manager can query the network resource information corresponding to the subnet in the network resource information list.

Manner 4: The first subnet manager obtains, from a virtual resource manager based on the requirement information of the subnet, the network resource information corresponding to the requirement information of the subnet.

In implementation, after obtaining the requirement information of the subnet, the first subnet manager may send a network resource information obtaining request to the virtual resource manager, where the request may carry the requirement information of the subnet. Then, the virtual resource manager may feed back, to the first subnet manager, the network resource information corresponding to the corresponding subnet.

Step 506: The first subnet manager configures a subnet based on the network resource information of the subnet.

In implementation, after obtaining the network resource information corresponding to the subnet, the first subnet manager may configure the first subnet based on the network resource information corresponding to the subnet.

Step 507: The first subnet manager sends a subnet notification message to the network slice manager.

The subnet notification message carries the network resource information corresponding to the subnet.

In implementation, after configuring the first subnet, the first subnet manager may send the subnet notification message to the network slice manager, to notify the network slice manager that the first subnet has been configured or notify the network slice manager of network resource information corresponding to the first subnet. In addition, the subnet notification message may carry the network resource information corresponding to the subnet. The network resource herein corresponding to the subnet may include at least one of the following: network resource information corresponding to the TN subnet, network resource information corresponding to the AN subnet, and network resource information corresponding to the CN subnet.

Step 508: The network slice manager receives the subnet notification message sent by the first subnet manager, and obtains the network resource information that is corresponding to the subnet and that is carried in the subnet notification message.

In implementation, the network slice manager may receive the subnet notification message sent by the first subnet manager, and then obtain the network resource information that is corresponding to the subnet and that is carried in the subnet notification message.

Step 509: The network slice manager sends a subnet management request to a subnet manager.

The subnet management request carries the network resource information corresponding to the subnet.

In implementation, after obtaining the network resource information corresponding to the subnet, the network slice manager may send the network resource information of the subnet to the subnet manager in a form of the subnet management request. It is not difficult to understand that in step 503, the network slice manager has sent the subnet management request to the first subnet manager (namely, the TN subnet manager), and in this case, may send the subnet management request to a subnet manager other than the first subnet manager. Specifically, if there are an AN subnet manager, a CN subnet manager, and the TN subnet manager, the network slice may send the subnet management request to the AN subnet manager and the CN subnet manager in this step.

Step 510: A second subnet manager receives a subnet management request sent by the network slice manager, and obtains the network resource information that is corresponding to the subnet and that is carried in the subnet management request.

The second subnet manager may be an AN subnet manager or a CN subnet manager.

In implementation, after the network slice manager sends the subnet management request to the subnet manager, the second subnet manager may receive the corresponding subnet management request, and then obtain the network resource information that is corresponding to the subnet and that is carried in the subnet management request.

Step 511: The second subnet manager configures a subnet based on the network resource information of the subnet.

In implementation, after obtaining the network resource information corresponding to the subnet, the second subnet manager may configure a second subnet based on the network resource information corresponding to the subnet. The second subnet herein may be the AN subnet or the CN subnet. In this embodiment, the AN subnet manager and the CN subnet manager perform processing basically in a same manner, and therefore are collectively referred to as the second subnet manager, and are not separately described.

Step 512: The second subnet manager sends a subnet notification message to the network slice manager.

In implementation, after configuring the second subnet, the second subnet manager may send the subnet notification message to the network slice manager, to notify the network slice manager that the second subnet has been configured.

Step 513: The network slice manager receives the subnet notification message sent by the second subnet manager to activate the network slice.

In implementation, the network slice manager may receive the subnet notification message sent by the second subnet manager to learn that the second subnet has been configured. In this way, if the network slice includes the TN subnet, the CN subnet, and the AN subnet, after receiving a CN subnet notification message and an AN subnet notification message, the network slice manager may determine that all subnets included in the network slice have been configured, so that the network slice can be activated. Therefore, the network slice is configured.

Figure 6:
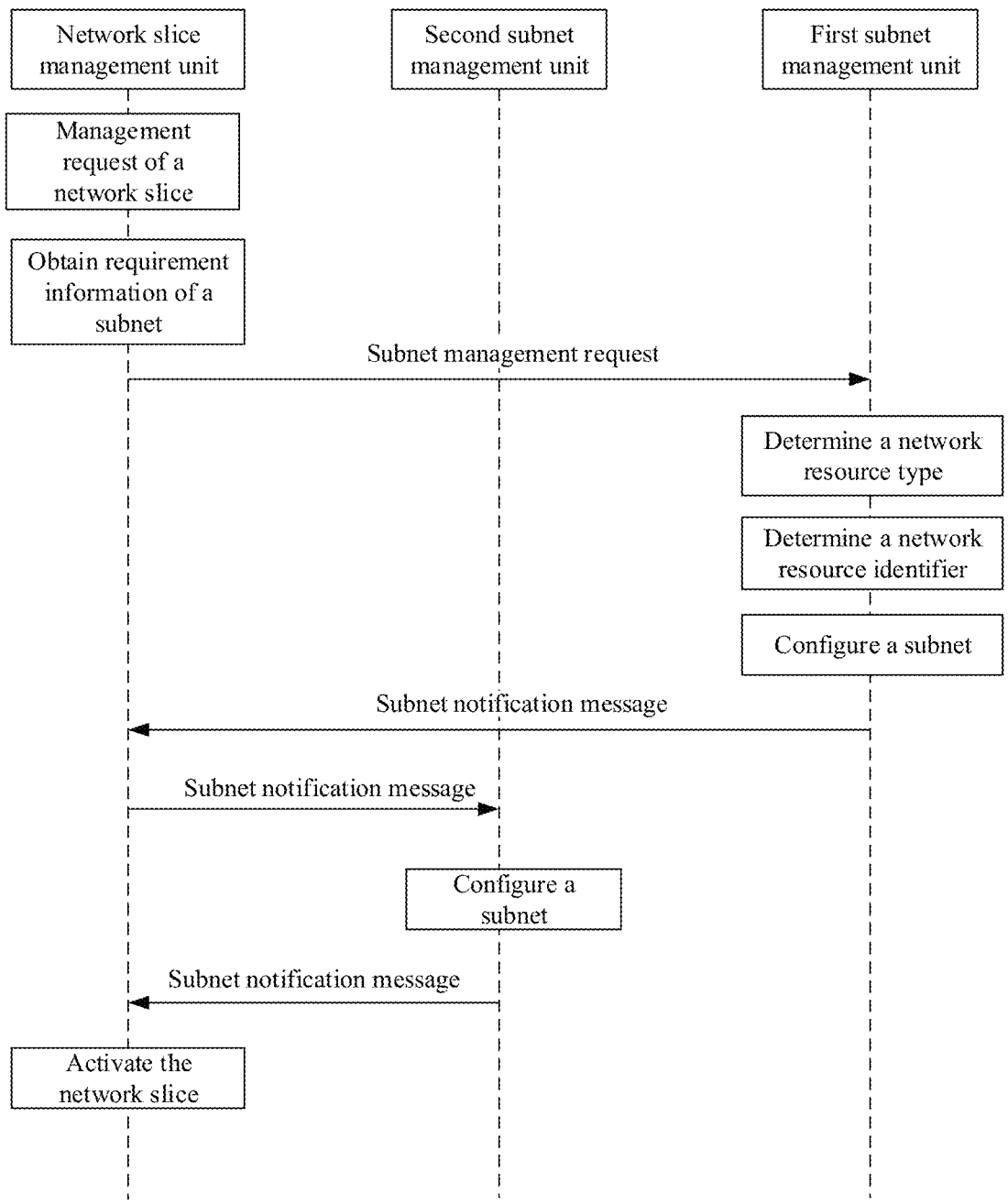
FIG. 6 is a schematic flowchart of configuring a network slice according to an embodiment of the present invention.

FIG. 6 is a schematic flowchart of configuring the network slice in step 501 to step 513.

In this embodiment of the present invention, the first subnet manager determines the network resource information and returns the network resource information to the network slice manager, and then the network slice manager instructs another subnet manager to configure the subnet, to automatically complete network slice configuration work, so that time and energy of a technician are saved because the technician does not need to manually configure the network slice, thereby improving network slice configuration efficiency.

Figure 7:
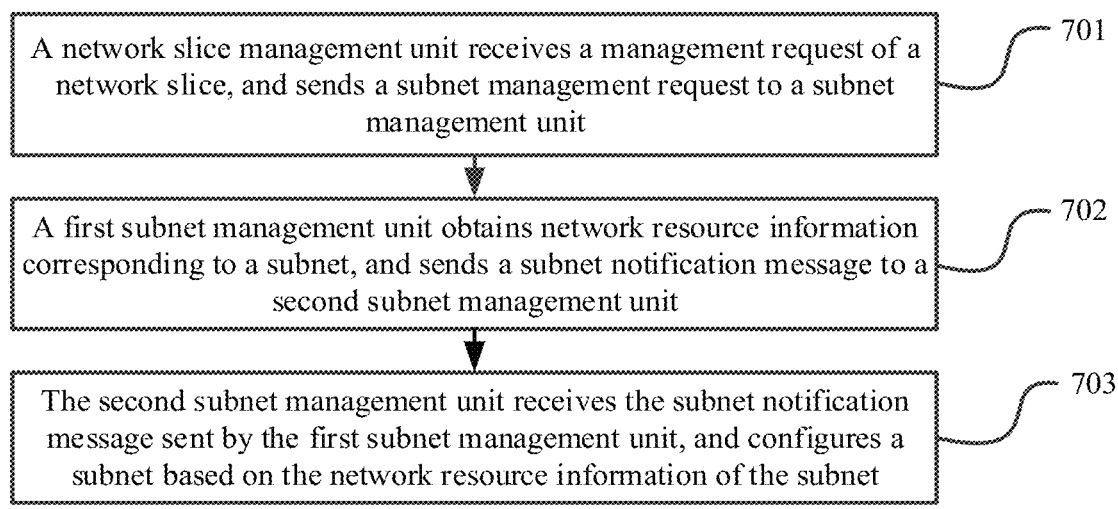
FIG. 7 is a flowchart of a network slice configuration method according to an embodiment of the present invention.

An embodiment of this application further provides another network slice configuration method. As shown in FIG. 7, the following content may be included.

Step 701: A network slice manager receives a management request of a network slice, and sends a subnet management request to a subnet manager.

In implementation, the network slice manager may receive the management request that is of the network slice and that is sent by a user, a BSS, or an SM, then generate the subnet management request based on the management request of the network slice, and send the subnet management request to each subnet manager.

Step 702: A first subnet manager obtains network resource information corresponding to a subnet, and sends a subnet notification message to a second subnet manager.

The subnet notification message carries the network resource information of the subnet. The network resource information corresponding to the subnet may be used by the second subnet manager to configure a second subnet. The network resource information corresponding to the subnet may also be referred to as network slice network resource information, network resource information, network slice transmission resource information, transmission resource information, subnet connection information, network connection information, a subnet connection point, a subnet IP address, transmission resource information corresponding to the subnet, or the like. The network resource information herein corresponding to the subnet may be connection information of a network component (for example, a network function) included in the subnet.

In implementation, after receiving the subnet management request sent by the network slice manager, the first subnet manager may first obtain the network resource information of the subnet corresponding to the network slice, and then send, to the second subnet manager, the subnet notification message carrying the network resource information of the subnet, so that after receiving the subnet notification message, the second subnet manager can configure the second subnet based on the network resource information that is of the subnet and that is carried in the subnet notification message.

It should be noted that in a current processing procedure, a communications interface exists between the first subnet manager and the second subnet manager, and is configured to transmit the subnet notification message. In the processing procedure of steps 201 to 203, a communications interface may or may not exist between the first subnet manager and the second subnet manager.

Optionally, the network resource information includes at least one of a network resource type and a network resource identifier.

Step 703: The second subnet manager receives the subnet notification message sent by the first subnet manager, and configures a subnet based on the network resource information of the subnet.

The subnet notification message carries the network resource information corresponding to the subnet, and the second subnet manager may be a CN subnet manager/an AN subnet manager.

In implementation, after receiving the subnet notification message sent by the first subnet manager, the second subnet manager may obtain the network resource information that is corresponding to the subnet and that is carried in the subnet notification message, and then configure the second subnet based on the network resource information that is corresponding to the second subnet and that is included in the subnet notification message.

Optionally, a procedure of step 701 to step 703 may specifically include the following feasible processing procedures based on different configuration manners.

Figure 8:
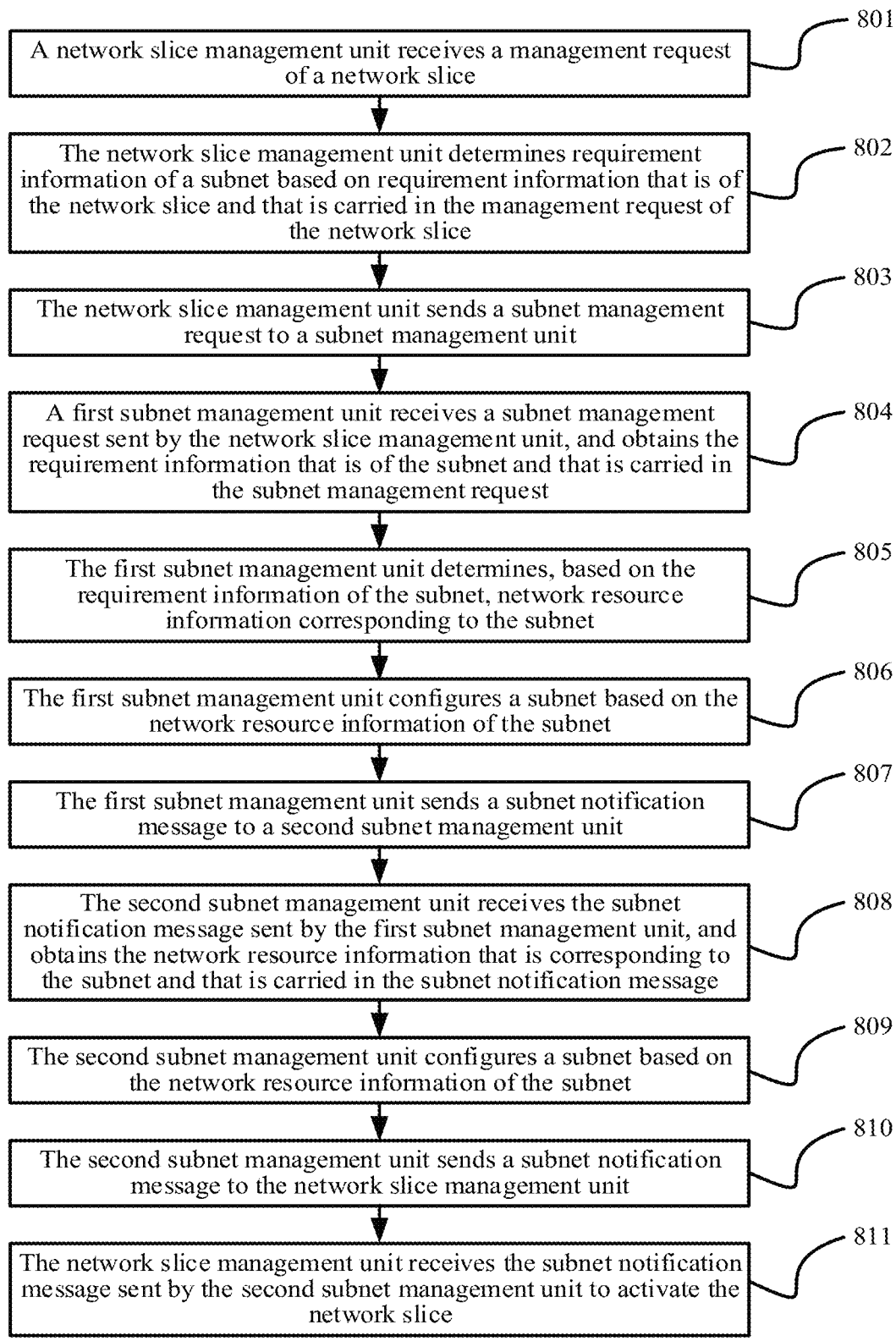
FIG. 8 is a flowchart of a network slice configuration method according to an embodiment of the present invention.

A procedure 1 is shown in FIG. 8.

Step 801: A network slice manager receives a management request of a network slice.

For detailed processing, refer to step 301.

Step 802: The network slice manager determines requirement information of a subnet based on requirement information that is of the network slice and that is carried in the management request of the network slice.

For detailed processing, refer to step 502.

Step 803: The network slice manager sends a subnet management request to a subnet manager.

The subnet management request carries the requirement information of the subnet.

In implementation, after determining requirement information of each subnet, the network slice manager may send a corresponding subnet management request to each subnet manager. For example, if the subnet managers include a TN subnet manager, a CN subnet manager, and an AN subnet manager, the network slice manager may send a TN subnet management request to the TN subnet manager, send an AN subnet management request to the AN subnet manager, and send the CN subnet management request to the CN subnet manager.

Optionally, before sending the subnet management request, the network slice manager may determine address information of the subnet manager, and add the address information of the subnet manager to the subnet management request. Specifically, the TN subnet management request may carry address information of a second subnet manager (namely, address information of the AN subnet manager and/or address information of the CN subnet manager), and the AN subnet management request or the CN subnet management request may carry address information of a first subnet manager (namely, address information of the TN subnet manager).

Optionally, after receiving the management request of the network slice, the network slice manager may allocate a corresponding network slice identifier to the network slice, to uniquely identify a to-be-configured network slice; or may use a first subnet identifier, a second subnet identifier, or the like to uniquely identify a to-be-configured network slice. In this way, the subnet management request may further carry the network slice identifier.

Step 804: The first subnet manager receives the subnet management request sent by the network slice manager, and obtains the requirement information that is of the subnet and that is carried in the subnet management request.

Step 805: The first subnet manager determines, based on the requirement information of the subnet, network resource information corresponding to the subnet.

For detailed processing, refer to step 505.

Step 806: The first subnet manager configures a subnet based on the network resource information of the subnet.

In implementation, after obtaining the network resource information corresponding to the subnet, the first subnet manager may configure a first subnet based on the network resource information corresponding to the subnet.

Step 807: The first subnet manager sends a subnet notification message to the second subnet manager.

The subnet notification message carries the network resource information of the subnet.

In implementation, after obtaining the network resource information corresponding to the subnet, the first subnet manager may send, to the second subnet manager, the subnet notification message carrying the network resource information of the subnet.

Optionally, when the subnet management request carries the address information of the subnet manager, processing in step 807 may be as follows: The first subnet manager sends the subnet notification message to the second subnet manager based on the address information of the second subnet manager.

In implementation, after receiving the subnet management request sent by the network slice manager, the first subnet manager may obtain the address information that is of the second subnet manager and that is carried in the subnet management request. Therefore, after obtaining the network resource information corresponding to the subnet, the first subnet manager may send, to the second subnet manager based on the address information of the second subnet manager, the subnet notification message carrying the network resource information of the subnet.

Optionally, when the subnet management request carries the network slice identifier, the subnet notification message in step 807 may further carry the network slice identifier.

It should be noted that step 806 and step 807 are not necessarily performed in sequence. Step 807 may be performed before step 806, or may be simultaneously performed with step 806.

Step 808: The second subnet manager receives the subnet notification message sent by the first subnet manager, and obtains the network resource information that is corresponding to the subnet and that is carried in the subnet notification message.

In implementation, after the first subnet manager sends the subnet notification message to the second subnet manager, the second subnet manager may receive a corresponding subnet notification message, and then obtain the network resource information that is corresponding to the subnet and that is carried in the subnet notification message.

It should be noted that the network resource information herein corresponding to the subnet may be considered as network resource information of the AN subnet or CN subnet, or network resource information of the TN subnet corresponding to the AN subnet or CN subnet.

Step 809: The second subnet manager configures a subnet based on the network resource information of the subnet.

For detailed processing, refer to step 511.

Optionally, when the subnet management request carries the network slice identifier, before step 808, the second subnet manager may receive the subnet management request sent by the network slice manager, and obtain and store a corresponding network slice identifier. In this way, after receiving the subnet notification message sent by the first subnet manager, the second subnet manager may also obtain the network slice identifier carried in the subnet notification message, and verify the subnet notification message based on the network slice identifier. If verification succeeds, the second subnet manager may perform step 809 to configure a second subnet.

Optionally, when the subnet management request carries the network slice identifier, before step 808, the second subnet manager may receive the subnet management request sent by the network slice manager, and obtain and store a corresponding network slice identifier. In this way, after receiving the subnet notification message sent by the first subnet manager, the second subnet manager may also obtain the network slice identifier carried in the subnet notification message, and select a corresponding second subnet based on the network slice identifier to perform step 809 on the selected second subnet.

Step 810: The second subnet manager sends a subnet notification message to the network slice manager.

In implementation, after configuring the second subnet, the second subnet manager may send the subnet notification message to the network slice manager, to notify the network slice manager that the second subnet has been configured.

Step 811: The network slice manager receives the subnet notification message sent by the second subnet manager to activate the network slice.

In implementation, the network slice manager may receive the subnet notification message sent by the second subnet manager to learn that the second subnet has been configured. In this way, if the network slice includes the TN subnet, the CN subnet, and the AN subnet, after receiving a CN subnet notification message and an AN subnet notification message, the network slice manager may determine that all subnets included in the network slice have been configured, so that the network slice can be activated. Therefore, the network slice is configured.

Figure 9:
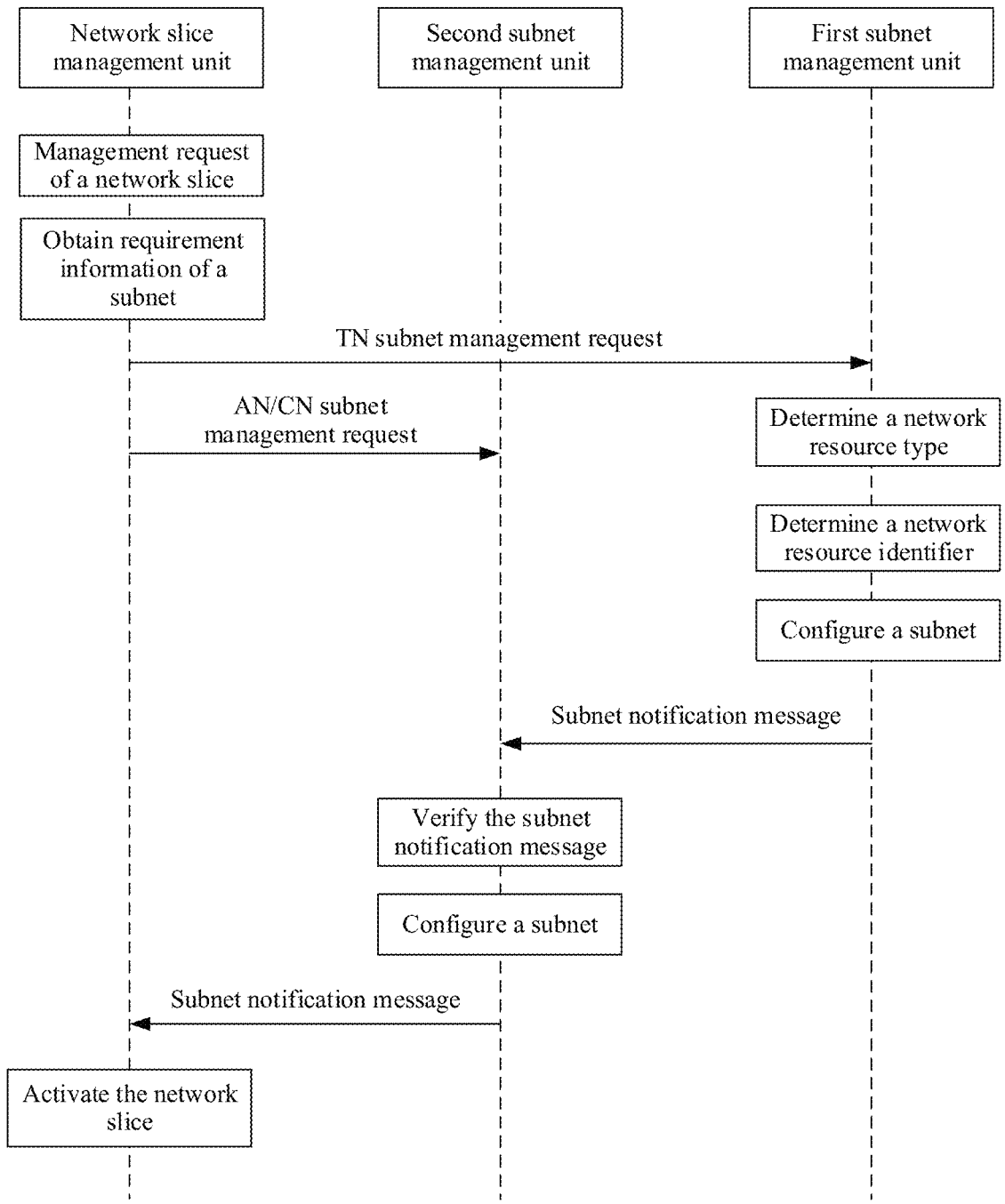
FIG. 9 is a schematic flowchart of configuring a network slice according to an embodiment of the present invention.

FIG. 9 is a schematic flowchart of configuring the network slice in step 801 to step 811.

In this embodiment of the present invention, the first subnet manager determines the network resource information and returns the network resource information to the network slice manager, and then the first subnet manager may instruct, by using an interface between subnet managers, another subnet manager to configure the subnet, to automatically complete network slice configuration work, so that time and energy of a technician are saved because the technician does not need to manually configure the network slice, thereby improving network slice configuration efficiency. In addition, processing resources of the network slice manager can be saved because the network slice manager does not need to forward the network resource information.

Figure 10:
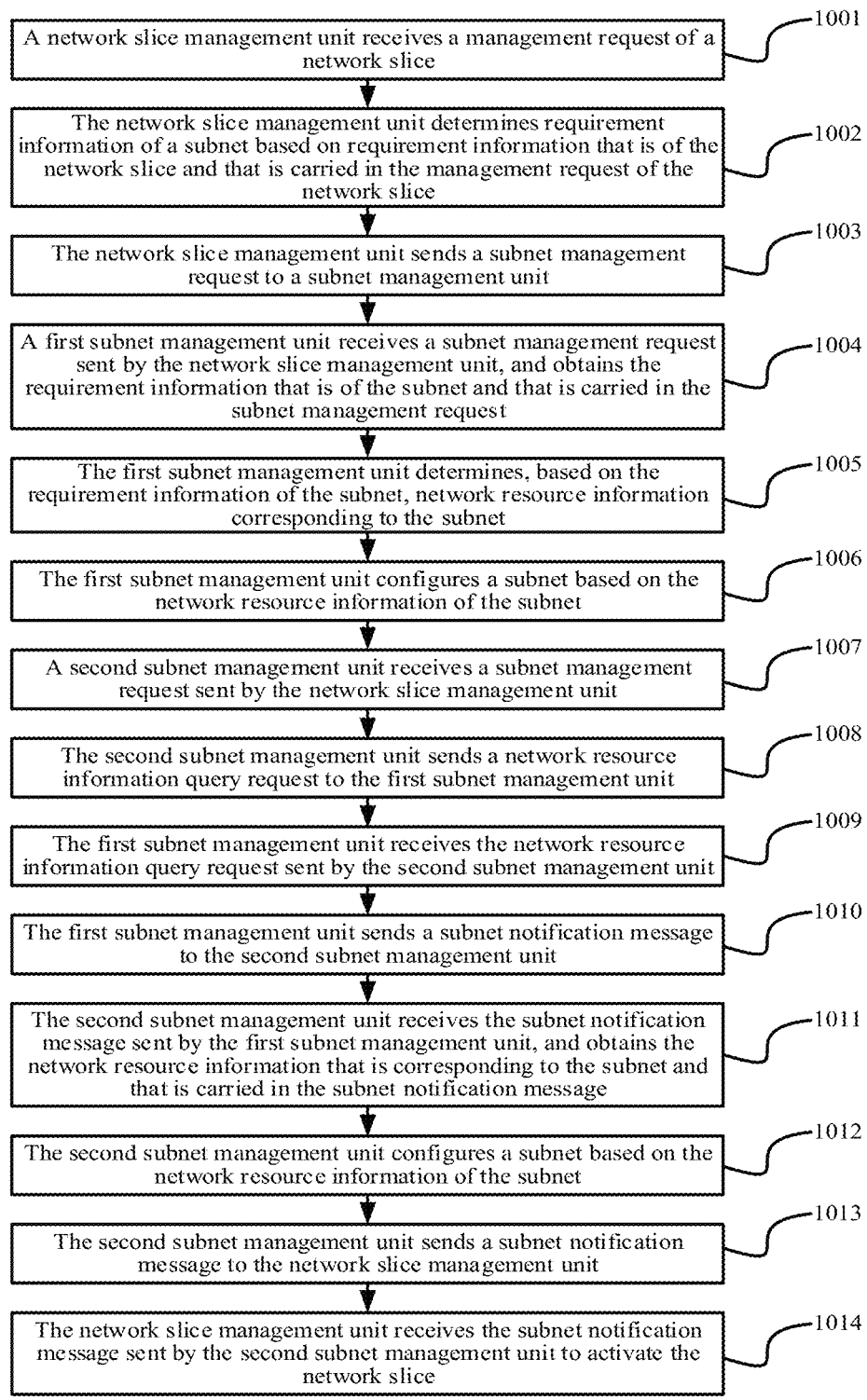
FIG. 10 is a flowchart of a network slice configuration method according to an embodiment of the present invention.

A procedure 2 is shown in FIG. 10.

Step 1001: A network slice manager receives a management request of a network slice.

For detailed processing, refer to step 301.

Step 1002: The network slice manager determines requirement information of a subnet based on requirement information that is of the network slice and that is carried in the management request of the network slice.

For detailed processing, refer to step 502.

Step 1003: The network slice manager sends a subnet management request to a subnet manager.

For detailed processing, refer to step 803.

Optionally, before sending the subnet management request, the network slice manager may determine address information of the subnet manager, and add the address information of the subnet manager to the subnet management request. Specifically, a TN subnet management request may carry address information of a second subnet manager (namely, address information of an AN subnet manager and/or address information of a CN subnet manager), and an AN subnet management request or a CN subnet management request may carry address information of a first subnet manager (namely, address information of a TN subnet manager).

Optionally, after receiving the management request of the network slice, the network slice manager may allocate a corresponding network slice identifier to the network slice, to uniquely identify a to-be-configured network slice, or may use a first network slice identifier, a second network slice identifier, or the like to uniquely identify a to-be-configured network slice. In this way, the subnet management request may further carry the network slice identifier.

Step 1004: The first subnet manager receives the subnet management request sent by the network slice manager, and obtains the requirement information that is of the subnet and that is carried in the subnet management request.

Step 1005: The first subnet manager determines, based on the requirement information of the subnet, network resource information corresponding to the subnet.

For detailed processing, refer to step 505.

Step 1006: The first subnet manager configures the subnet based on the network resource information of the subnet.

Step 1007: The second subnet manager receives the subnet management request sent by the network slice manager.

Step 1008: The second subnet manager sends a network resource information query request to the first subnet manager.

Optionally, when the subnet management request carries the address information of the subnet manager, processing in step 1008 may be as follows: The second subnet manager sends the network resource information query request to the first subnet manager based on the address information of the first subnet manager.

In implementation, after receiving the subnet management request sent by the network slice manager, the second subnet manager may obtain the address information that is of the first subnet manager and that is carried in the subnet management request. Therefore, the second subnet manager may send the network resource information query request to the first subnet manager based on the address information of the first subnet manager.

Optionally, the network resource information query request may further carry the network slice identifier.

Step 1009: The first subnet manager receives the network resource information query request sent by the second subnet manager.

Step 1007 and step 1008 may be performed before step 1004 and step 1005, or may be simultaneously performed with step 1004 and step 1005.

Step 1010: The first subnet manager sends a subnet notification message to the second subnet manager.

Optionally, when the subnet management request carries the network slice identifier, processing in step 1010 may be as follows: The first subnet manager determines the network resource information of the subnet corresponding to the network slice identifier, and sends, to the second subnet manager, the subnet notification message carrying the network resource information of the subnet.

In implementation, the first subnet manager may obtain both the network resource information corresponding to the subnet and the network slice identifier carried in the subnet management request, and then store a correspondence between the network resource information corresponding to the subnet and the network slice identifier. In this way, after receiving the network resource information query request sent by the second subnet manager, the first subnet manager may obtain the network resource information of the corresponding subnet based on the network slice identifier carried in the network resource information query request, and may send the network resource information of the subnet to the second subnet manager in a manner of the subnet notification message.

Step 1011: The second subnet manager receives the subnet notification message sent by the first subnet manager, and obtains the network resource information that is corresponding to the subnet and that is carried in the subnet notification message.

Step 1012: The second subnet manager configures a subnet based on the network resource information of the subnet.

For detailed processing, refer to step 511.

Step 1013: The second subnet manager sends a subnet notification message to the network slice manager.

In implementation, after configuring the second subnet, the second subnet manager may send the subnet notification message to the network slice manager, to notify the network slice manager that the second subnet has been configured.

Step 1014: The network slice manager receives the subnet notification message sent by the second subnet manager to activate the network slice.

In implementation, the network slice manager may receive the subnet notification message sent by the second subnet manager to learn that the second subnet has been configured. In this way, if the network slice includes a TN subnet, a CN subnet, and an AN subnet, after receiving a CN subnet notification message and an AN subnet notification message, the network slice manager may determine that all subnets included in the network slice have been configured, so that the network slice can be activated. Therefore, the network slice is configured.

Figure 11:
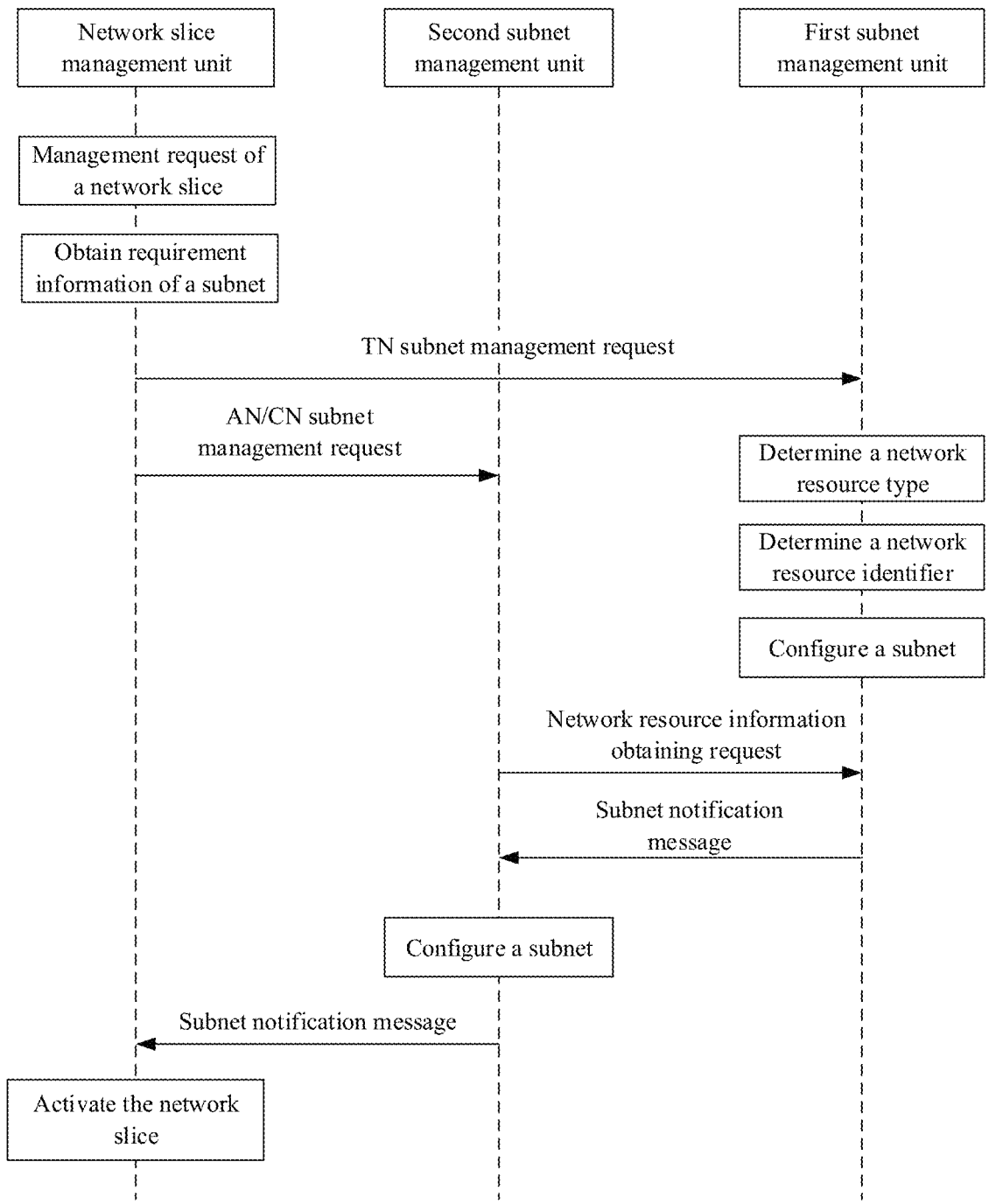
FIG. 11 is a schematic flowchart of configuring a network slice according to an embodiment of the present invention.

FIG. 11 is a schematic flowchart of configuring the network slice in step 1001 to step 1014.

In this embodiment of the present invention, the first subnet manager determines the network resource information and returns the network resource information to the network slice manager, and then the first subnet manager may instruct, by using an interface between subnet managers, another subnet manager to configure the subnet, to automatically complete network slice configuration work, so that time and energy of a technician are saved because the technician does not need to manually configure the network slice, thereby improving network slice configuration efficiency. In addition, processing resources of the network slice manager can be saved because the network slice manager does not need to forward the network resource information.

Figure 12:
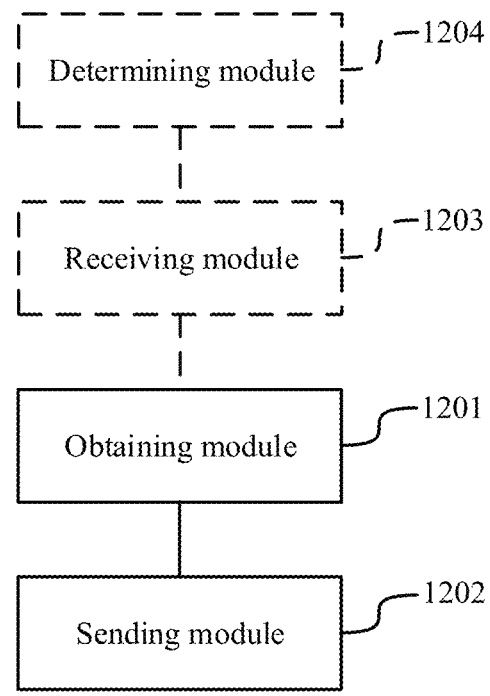
FIG. 12 is a schematic structural diagram of a network slice configuration apparatus according to an embodiment of the present invention.

FIG. 12 is a block diagram of a network slice configuration apparatus according to an embodiment of this disclosure. The network slice configuration apparatus may be implemented as a part or all of an apparatus by using software, hardware, or a combination of software and hardware. The network slice configuration apparatus includes an obtaining module 1201, a sending module 1202, a receiving module 1203, and a determining module 1204.

The obtaining module 1201 is configured to determine or obtain network resource information corresponding to a subnet.

The sending module 1202 is configured to send a subnet management request to a subnet manager, where the subnet management request carries the network resource information corresponding to the subnet, and the network resource information corresponding to the subnet is used by the subnet manager to configure the subnet.

Optionally, the apparatus further includes:
the receiving module 1203 is configured to: before the network resource information corresponding to the subnet is determined or obtained, receive a management request of a network slice, where the management request of the network slice carries requirement information of the network slice.

The obtaining module 1201 is specifically configured to:
determine, based on the requirement information of the network slice, the network resource information corresponding to the subnet, where the network slice includes the subnet.

Optionally, the obtaining module 1201 is specifically configured to:
determine a network slice template based on the requirement information of the network slice, and obtain the network resource information that is corresponding to the subnet and that is recorded in the network slice template, where the network slice template is used to create a network slice instance; or
obtain the network resource information that is corresponding to the subnet and that is included in the requirement information of the network slice; or
query, based on the requirement information of the network slice, the network resource information corresponding to the subnet in a prestored network resource information list; or
obtain, based on the requirement information of the network slice, the network resource information corresponding to the subnet from a virtual resource manager.

Optionally, the obtaining module 1201 is specifically configured to:
receive a subnet notification message sent by a first subnet manager, and obtain the network resource information that is corresponding to the subnet and that is carried in the subnet notification message.

Optionally, the apparatus further includes:
the determining module 1204 is configured to: before the subnet notification message sent by the first subnet manager is received, receive a management request of a network slice, and determine requirement information of the subnet based on requirement information that is of the network slice and that is carried in the management request of the network slice.

The sending module is further configured to send a first subnet management request to the first subnet manager, where the first subnet management request carries the requirement information of the subnet.

Optionally, the network resource information includes at least one of a network resource type and a network resource identifier.

The obtaining module 1201, the sending module 1202, the receiving module 1203, and the determining module 1204 may be implemented by a processor, or may be implemented by a processor in cooperation with a transceiver.

Figure 13:
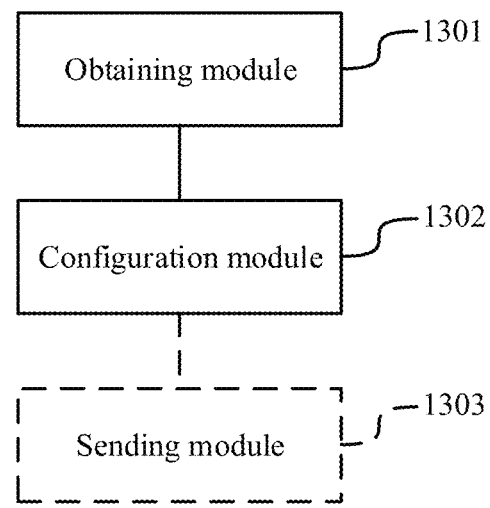
FIG. 13 is a schematic structural diagram of a network slice configuration apparatus according to an embodiment of the present invention.

FIG. 13 is a block diagram of a network slice configuration apparatus according to an embodiment of this disclosure. The network slice configuration apparatus may be implemented as a part or all of an apparatus by using software, hardware, or a combination of software and hardware. The network slice configuration apparatus includes an obtaining module 1301, a configuration module 1302, and a sending module 1303.

The obtaining module 1301 is configured to determine or obtain network resource information corresponding to a subnet.

The configuration module 1302 is configured to configure the subnet based on the network resource information corresponding to the subnet.

Optionally, the obtaining module 1301 is specifically configured to:
receive a subnet management request sent by a network slice manager, and obtain the network resource information that is corresponding to the subnet and that is carried in the subnet management request.

Optionally, the obtaining module 1301 is specifically configured to:
receive a subnet management request sent by a network slice manager, and obtain requirement information that is of the subnet and that is carried in the subnet management request; and
determine, based on the requirement information of the subnet, the network resource information corresponding to the subnet.

Optionally, the apparatus further includes:
the sending module 1303 is configured to: after the network resource information corresponding to the subnet is determined based on the requirement information of the subnet, send a subnet notification message to the network slice manager, where the subnet notification message carries the network resource information corresponding to the subnet.

The obtaining module 1301, the configuration module 1302, and the sending module 1303 may be implemented by a processor, or may be implemented by a processor in cooperation with a transceiver.

It should be noted that when the network slice configuration apparatus provided in the foregoing embodiments configures a network slice, division of the foregoing function modules is merely used as an example for illustration. In actual application, the foregoing functions may be allocated to different function modules for implementation as required. To be specific, an inner structure of the apparatus is divided into different function modules to implement all or some of the functions described above. In addition, the network slice configuration apparatus provided in the foregoing embodiments pertains to a same concept as the embodiments of the network slice configuration method. For a specific implementation process of the network slice configuration apparatus, refer to the method embodiments. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer program instructions. When the computer program instructions are loaded and executed on a network slice manager/first subnet manager, the procedures or functions according to the embodiments of the present invention are all or partially generated. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer readable storage medium may be any usable medium accessible by a base station, or a data storage device, such as a server or a data center, integrating one or more usable media. The usable medium may be a magnetic medium (for example, a floppy disk, a hard disk, or a magnetic tape), an optical medium (for example, a digital video disc (DVD)), or a semiconductor medium (for example, a solid state drive).

The foregoing descriptions are merely an embodiment of this application, but are not intended to limit this application.

Any modification, equivalent replacement, or improvement made without departing from the spirit and principle of this application shall fall within the protection scope of this application.

What is claimed is:

1. A network slice manager, comprising at least one processor, and one or more memories coupled to the at least one processor, wherein the one or more memories are configured to store non-transitory computer-readable instructions, and wherein the at least one processor is configured to execute the non-transitory computer-readable instructions to cause the network slice manager to:
- determine or obtain transport resource information corresponding to a first subnet comprised in a network slice, wherein the first subnet is an access network (AN) subnet or a core network (CN) subnet, wherein the transport resource information is for configuring a communication connection between the first subnet and a second subnet comprised in the network slice; and
- send the transport resource information to a subnet manager, wherein the subnet manager is to configure the first subnet based on the transport resource information.

2. The network slice manager according to claim 1, wherein the at least one processor is further configured to execute the non-transitory computer-readable instructions to cause the network slice manager to:
- determine the transport resource information based on requirement information of the network slice.

3. The network slice manager according to claim 1, wherein the transport resource information comprises at least one of a transport resource type or a transport resource identifier (ID).

4. The network slice manager according to claim 3,
- wherein the transport resource type comprises at least one of a local area network (LAN) type, a virtual LAN (VLAN) type, a virtual extensible LAN (VXLAN) type, a generic routing encapsulation (GRE) type, or a layer-3 virtual private network (L3-VPN) type; or
- wherein the transport resource ID comprises at least one of a LAN ID, a VLAN ID, a VXLAN ID, a GRE key, or an L3-VPN ID.

5. The network slice manager according to claim 3, wherein the at least one processor is further configured to execute the non-transitory computer-readable instructions to cause the network slice manager to:
- determine the transport resource type based on requirement information of the network slice; or
- determine the transport resource identifier.

6. The network slice manager according to claim 1, wherein the at least one processor is further configured to execute the non-transitory computer-readable instructions to cause the network slice manager to:
- receive a management request, wherein the management request comprises requirement information of the network slice.

7. The network slice manager according to claim 1, wherein the at least one processor is further configured to execute the non-transitory computer-readable instructions to cause the network slice manager to:
- receive a subnet notification message from the subnet manager, wherein the subnet notification message indicates that the first subnet has been configured.

8. The network slice manager according to claim 1, wherein the at least one processor is further configured to execute the non-transitory computer-readable instructions to cause the network slice manager to:
- receive the transport resource information; and
- configure the communication connection based on the transport resource information.

9. The network slice manager according to claim 8, wherein the at least one processor is further configured to execute the non-transitory computer-readable instructions to cause the network slice manager to:
- send, after configuring the communication connection, a subnet notification message to the network slice manager, wherein the subnet notification message indicates that the first subnet has been configured.

10. A subnet manager, comprising at least one processor, and one or more memories coupled to the at least one processor, wherein the one or more memories are configured to store non-transitory computer-readable instructions, and wherein the at least one processor is configured to execute the non-transitory computer-readable instructions to cause the subnet manager to:
- receive transport resource information corresponding to a first subnet comprised in a network slice, wherein the first subnet is an access network (AN) subnet, or a core network (CN) subnet, and the transport resource information corresponding to the first subnet is sent by a network slice manager; and
- configure a communication connection between the first subnet and a second subnet comprised in the network slice based on the transport resource information.

11. The subnet manager according to claim 10, wherein the transport resource information comprises at least one of a transport resource type or a transport resource identifier (ID).

12. The subnet manager according to claim 11,
- wherein the transport resource type comprises at least one of a local area network (LAN) type, a virtual LAN (VLAN) type, a virtual extensible LAN (VXLAN) type, a generic routing encapsulation (GRE) type, or a layer-3 virtual private network (L3-VPN) type; or
- wherein the transport resource ID comprises at least one of a LAN ID, a VLAN ID, a VXLAN ID, a GRE key, or an L3-VPN ID.

13. The subnet manager according to claim 10, wherein the at least one processor is further configured to execute the non-transitory computer-readable instructions to cause the subnet manager to:
- send a subnet notification message to the network slice manager to inform that the first subnet has been configured.

14. A network slice configuration method, comprising:
- determining or obtaining, by a network slice manager, transport resource information corresponding to a first subnet comprised in a network slice, wherein the first subnet is an access network (AN) subnet or a core network (CN) subnet, wherein the transport resource information is for configuring a communication connection between the first subnet and a second subnet comprised in the network slice;
- sending, by the network slice manager, the transport resource information to a subnet manager, wherein the subnet manager is to configure the first subnet based on the transport resource information;
- receiving, by the subnet manager, the transport resource information; and
- configuring, by the subnet manager, the communication connection.

15. The method according to claim 14, wherein the transport resource information comprises at least one of a transport resource type or a transport resource identifier (ID).

16. The method according to claim 14, wherein the determining or obtaining of the transport resource information comprises:
- determining the transport resource information based on requirement information of the network slice.

17. The method according to claim 15, wherein the determining or obtaining of the transport resource information comprises at least one of:
- determining, by the network slice manager, the transport resource type based on requirement information of the network slice; or
- determining, by the network slice manager, the transport resource identifier.

18. The method according to claim 14, further comprising:
- receiving, by the network slice manager, a management request, wherein the management request comprises requirement information of the network slice.

19. The method according to claim 14, further comprising:
- receiving, by the network slice manager, a subnet notification message from the subnet manager, wherein the subnet notification message indicates that the first subnet has been configured.

20. The method according to claim 15, wherein after the configuring the communication connection, the method further comprises:
- sending, by the subnet manager, a subnet notification message to the network slice manager to inform that the first subnet has been configured.

* * * * *